US012670473B2

(12) United States Patent
Represas et al.

(10) Patent No.: US 12,670,473 B2
(45) **Date of Patent: *Jun. 30, 2026**

(54) TRANSACTION PROCESSING COMPUTER SYSTEM WITH MULTI-CHANNEL COMMUNICATION CONTROL AND DECISION SUPPORT

(71) Applicant: ABLE AI, INC., San Francisco, CA (US)

(72) Inventors: Diego Represas, San Francisco, CA (US); Andrew R. Hurst, San Francisco, CA (US)

(73) Assignee: Able AI, Inc., San Francisco, CA (US)

( * ) Notice: Subject to any disclaimer, the term of this patent is extended or adjusted under 35 U.S.C. 154(b) by 907 days.

This patent is subject to a terminal disclaimer.

(21) Appl. No.: 17/725,217

(22) Filed: Apr. 20, 2022

(65) Prior Publication Data

US 2023/0004424 A1 Jan. 5, 2023

Related U.S. Application Data

(60) Provisional application No. 63/216,955, filed on Jun. 30, 2021.

(51) Int. Cl.
G06F 16/93 (2019.01)
G06F 16/906 (2019.01)
(Continued)

(52) U.S. Cl.
CPC ......... G06Q 10/103 (2013.01); G06F 16/906 (2019.01); G06F 16/93 (2019.01); (Continued)

(58) Field of Classification Search
CPC ...... G06Q 40/03; G06Q 40/02; G06Q 40/039; G06Q 10/103; G06Q 10/10; (Continued)

(56) References Cited

U.S. PATENT DOCUMENTS 7,653,592 B1 1/2010 Flaxman et al.
7,689,443 B2 3/2010 Pepoon et al.
(Continued)

OTHER PUBLICATIONS

Moynihan, Maurice, Office Action for European Patent Application No. 22181805.7, dated Mar. 26, 2024, pub by the European Patent Office, The Netherlands, 5 pages.
(Continued)

*Primary Examiner* — Hao Fu
(74) *Attorney, Agent, or Firm* — Baker Botts L.L.P.

(57) ABSTRACT

An example method comprises generating one or more requests for information by a requesting party, via a document processing engine, transmitting, by the document processing engine, the one or more requests for information by the requesting party, via a multi-channel communication system, receiving, via the document processing engine, one or more documents and corresponding metadata transmitted by the requesting party, in response to the requests for information by the decisioning party, automatically processing, via the document processing engine, one or more documents and corresponding metadata transmitted by the requesting party, automatically validating, via the document processing engine, one or more documents and corresponding metadata transmitted by the requesting party, triggering, via the multi-channel communication system, one or more journeys, wherein completion of a journey results in a
(Continued)

communication by the multi-channel communication system, storing, via a system of record, the one or more processed documents and corresponding metadata.

14 Claims, 14 Drawing Sheets

(51) Int. Cl.

| | |
|---|---|
| *G06N 5/04* | (2023.01) |
| *G06Q 10/0631* | (2023.01) |
| *G06Q 10/10* | (2023.01) |
| *G06Q 30/016* | (2023.01) |
| *G06Q 40/03* | (2023.01) |
| *G06Q 40/08* | (2012.01) |

(52) U.S. Cl.
CPC ......... *G06N 5/04* (2013.01); *G06Q 10/06316* (2013.01); *G06Q 30/016* (2013.01); *G06Q 40/03* (2023.01); *G06Q 40/08* (2013.01)

(58) Field of Classification Search
CPC .. G06Q 10/0636; G06Q 30/016; G06Q 40/08; G06F 16/906; G06F 16/93; G06N 5/04
See application file for complete search history.

(56) References Cited

U.S. PATENT DOCUMENTS

| | | | | |
|---|---|---|---|---|
| 11,003,796 | B2 | 5/2021 | Tucker et al. | |
| 11,227,332 | B1 * | 1/2022 | Hecht | G06Q 40/03 |
| 2004/0260648 | A1 * | 12/2004 | Carlos | G06Q 40/02 |
| | | | | 705/42 |
| 2008/0300898 | A1 * | 12/2008 | Bacha | G06F 9/547 |
| | | | | 705/1.1 |
| 2017/0083490 | A1 * | 3/2017 | Kikin-Gil | G06Q 10/107 |
| 2019/0080396 | A1 * | 3/2019 | Pina | G06Q 40/02 |
| 2019/0340428 | A1 * | 11/2019 | Wickett | H04L 51/224 |
| 2020/0134009 | A1 * | 4/2020 | Zhao | G06N 3/044 |
| 2020/0364404 | A1 | 11/2020 | Priestas et al. | |
| 2021/0173854 | A1 * | 6/2021 | Wilshinsky | G06F 21/6254 |
| 2022/0083558 | A1 * | 3/2022 | Fujii | G06F 16/248 |

OTHER PUBLICATIONS

European Patent Office, Extended European Search Report for Application No. 22181805.7-1218, dated Dec. 1, 2022, 7 pages.
Yong Mann Weng, Search Report and Written Opinion for Singapore Application No. 10202250239C, dated Sep. 30, 2025, 12 pages, The Intellectual Property Office of Singapore, Singapore.

* cited by examiner

410 Journey J, active for relationship B

400 Journey J, active for relationship A

TRANSACTION PROCESSING COMPUTER SYSTEM WITH MULTI-CHANNEL COMMUNICATION CONTROL AND DECISION SUPPORT

PRIORITY

This application claims the benefit under 35 U.S.C. § 119(e) of provisional application 63/216,955, filed 30 Jun. 2021, the entire contents of which is hereby incorporated by reference for all purposes as if fully set forth herein.

COPYRIGHT NOTICE

TECHNICAL FIELD

One technical field the present disclosure relates to is computer-implemented transaction processing for transactions that require structured workflows and decision support. Another technical field is automated control of electronic communications using a plurality of different channels, where specified communications are triggered in response to advancement of the workflows.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

To get started or grow, businesses need a source of capital. Capital can be obtained by selling stock or equivalents (equity capital) or by raising debt (debt capital). For the vast majority of companies, and especially those that do not have or plan to have near-term access to the public markets, debt capital will be the primary source of capital. Today, the vast majority of this commercial debt capital in the U.S. will be provided by banks. There are other debt capital sources as well—non-bank traditional lenders, credit unions, and digital lenders ("neo-banks") are a few—but banks constitute the bulk of it.

Today, a company that seeks a large amount of debt capital (e.g., over $100,000) will have predominantly two options: the company can go to a lender that will give it a convenient, fast, mostly automated process that will quickly yield a high-cost loan (typically within a few days, and with APRs of 15-90%), or the company can go to a lender that will vet it more stringently over a longer timeline but will yield a more affordable loan (typically weeks to months, with APRs ranging from 2-4% up to 10-15%).

The core differentiator between the "fast, expensive" lenders and the "slow, cheap" ones is the thoroughness and strictness of their vetting, risk-measuring, and risk-mitigating process, which may be termed "underwriting". In order to both initially issue (that is, originate) and subsequently monitor larger (greater than $100,000) amounts of cheap capital, lenders generally have to go through an extensive underwriting process, including but not limited to: Analyzing and projecting the company's financial statements (that is, "spreading" the financials); Assessing industry and market risk; Performing due diligence on the company's corporate and legal standing, as well as that of their owners or key people; Identifying the creditworthiness of owners and key people in the company; Identifying, pricing, and obtaining liens to (that is, "securing") assets that can mitigate the lender's losses in the event of a company or market downturn; Ensuring and maintaining compliance with various regulations applicable to lenders and financial institutions.

It is thanks to this extensive underwriting that banks can lend at low rates as well as meet government regulatory requirements—they make sure to lend only in low-risk settings. However, this stringent underwriting process is also expensive and time-consuming: it currently takes weeks or months to perform and can cost the bank tens, if not hundreds of thousands of dollars per loan to fully execute. In addition, it is insufficient to measure risk—lenders holding these loans in their portfolio need to continuously assess the risk of these loans over the years to ensure the bank as a whole remains within a good risk posture. This adds to the overall cost of lending, a cost that must typically be passed down to the borrower in order for this model to work.

However, if banks could perform this stringent process much faster and at a lower cost, then banks could significantly reduce the time and resources they need to initially originate and subsequently monitor a loan. Many innovative companies have risen to this task, and their technology certainly helps banks with this problem. However, existing technologies have failed to address many of the critical inefficiencies in the origination and monitoring processes. Known solutions are not designed to work either in isolation, or in tandem with state-of-the-art technologies that banks already use to manage and their origination and underwriting processes.

SUMMARY

The appended claims may serve as a summary of the invention.

BRIEF DESCRIPTION OF THE DRAWINGS

In the drawings:

FIG. 4A illustrates one embodiment of an example journey flow.

FIG. 4B illustrates one embodiment of an example journey flow.

DETAILED DESCRIPTION

Figures 1A, 1B:
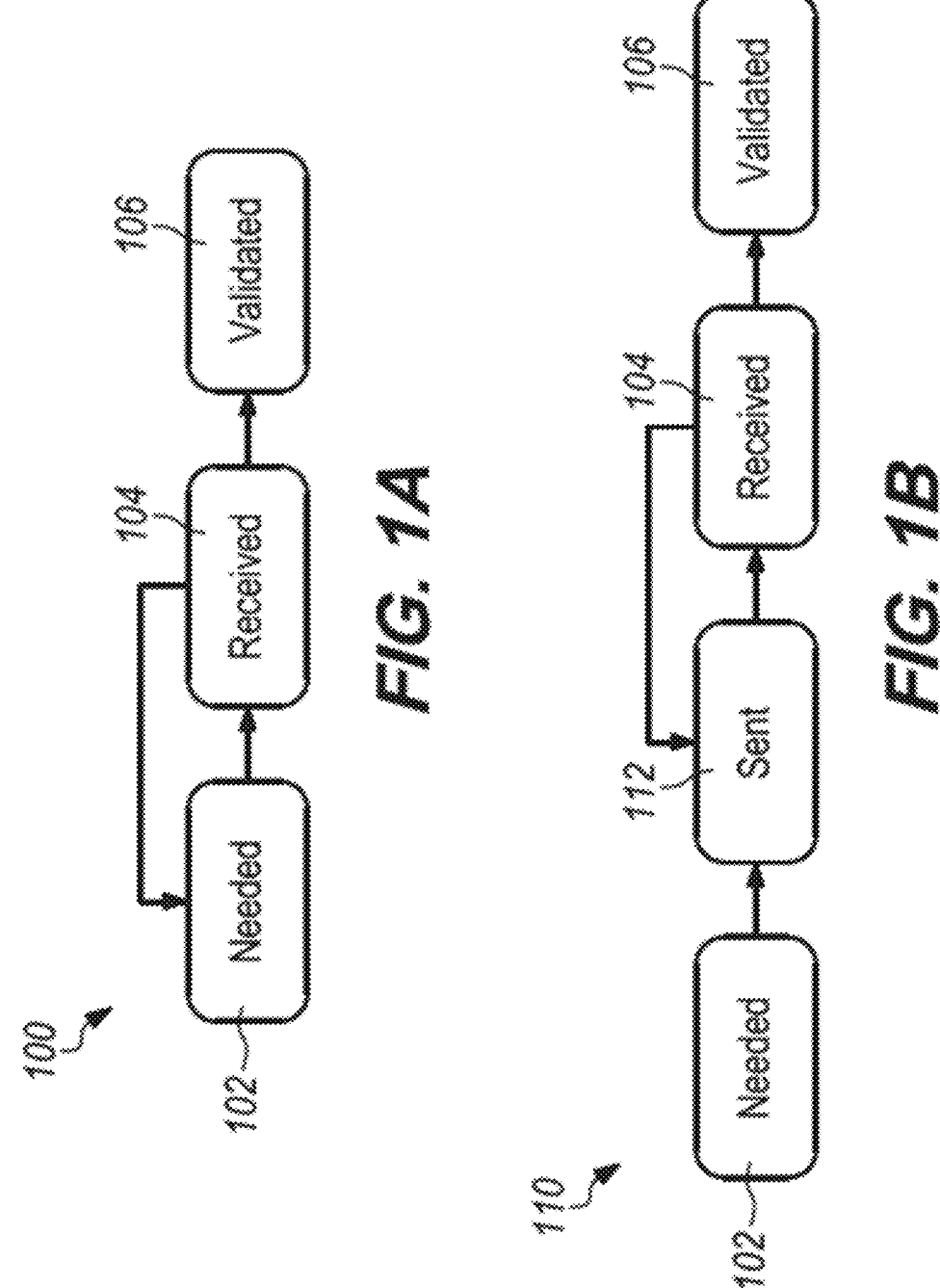
FIG. 1A illustrates a state transition diagram for data that is submitted to the decisioning party by the requesting party.
FIG. 1B illustrates a transition diagram for data that are first sent, then received by the decisioning party (for example an agreement that needs requestor signature).

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments are described in sections below according to the following outline:

1. General Overview
2. Structural & Functional Overview
3. Implementation Example—Hardware Overview

1. General Overview

Embodiments can be implemented using virtual computing environments coupled via networks to requester computers and decisioner computers. In one embodiment, a requester computer or user interface is communicatively coupled to a multi-channel communications controller to present electronic documents and requests. The electronic documents are propagated to a document processor that is programmed with a plurality of model-hosting services to execute machine-learning models such as classifiers to automatically infer content from the electronic documents, and to test inferred content against exception policies. When an exception is noted, a record referencing the electronic document is stored in association with a marking specifying that an intervention is required. However, marking or tagging a record as needing intervention does not need to be tied to creating and storing a record; embodiments can be programmed to store a copy of the document without needing to mark an intervention, and to mark an intervention on existing records without needing to have stored the copy. Consequently, the system can be programmed to can track the state of both documents or records that need and do not need an intervention. For example, assuming a document was submitted with a missing signature page, if the document was resubmitted with the missing page, then the system can be programmed to continue to track the state of the document with its state marked as "resolved" so that an intervention is not needed.

Requesters and/or decisioners may define workflows as journeys comprising an ordered sequences of tasks that execute sequentially or in parallel. A task comprises at least a message template for an electronic message to be sent to categorical recipients and metadata specifying one or more communication channels that the recipients may use, and an event the occurrence of which triggers execution of the task; if the document processor identified a failure of an exception policy, the task also can embed a reference to the exception. In response to detecting the occurrence of the event, the multi-channel communications controller executes the task by initiating one or more electronic messages, based on the template, using message content from the task, the electronic document, and a rendering of the embedding; recipient names for categorical recipients are obtained by calls to a CRM system or other data source. The message communication channel, message type, contents, and form of rendering may vary according to the system(s) in use by the recipients. In this manner, the system can manage, mediate, and facilitate complex transactional workflows in which documents always flow through the system in association with metadata and exception renderings that are accurate at the point in time at which a message is dispatched. Consequently, delays in transaction processing can be substantially reduced because message recipients are not required to reconcile stale data or process documents having contents that do not match a state shown elsewhere in a system.

In an embodiment, a computer-implemented method of transaction processing with multi-channel communication and decision support comprises: generating, by the decisioning party, one or more requests for information by a requesting party, via a document processing engine; transmitting, by the document processing engine, the one or more requests for information by the requesting party, via a multi-channel communication system; receiving, via the document processing engine, one or more documents and corresponding metadata transmitted by the requesting party, in response to the requests for information by the decisioning party; automatically processing, via the document processing engine, one or more documents and corresponding metadata transmitted by the requesting party; automatically validating, via the document processing engine, one or more documents and corresponding metadata transmitted by the requesting party; triggering, via the multi-channel communication system, one or more journeys comprised of one or more tasks, wherein completion of a journey results in a communication by the multi-channel communication system; and storing, via a system of record, the one or more processed documents and corresponding metadata.

In one feature, the method further comprises automatically identifying, via the document processing engine, subjects and named entities from one or more documents and corresponding metadata. In another feature, the method further comprises automatically matching, via the document processing engine, entities from one or more documents and corresponding metadata to back-end components. In a further feature, the method further comprises automatically categorizing, via the document processing engine, one or more documents and corresponding metadata according to a canonical document ontology.

In another feature, the method further comprises automatically transforming, via the document processing engine, one or more pages of the document to enhance legibility. In yet another feature, the method further comprises automatically identifying, via the document processing engine, conformity and/or nonconformity with exception conditions as defined in a document exception policy. In a further feature, the document exception policy further includes absence and/or existence of a signature; a signature block matching the name of the requestor; and a document execution date within a specific time range.

In another aspect, the method further comprises, in response to nonconformity with exception conditions as defined in the document exception policy, automatically storing the document in a data store for further intervention. In yet another feature, journeys further comprise tasks in a defined order and tasks are triggered by the completion of one or more subsequent tasks.

In still another feature, the method further comprises executing each of the tasks by: retrieving one or more message templates from a content management system ("CMS"); populating content from one or more messages by replacing one or more message recipients with the values as found by a back-end component, identifying template variables within the text of one or more messages and replacing the text with current values from a data store and/or back-end component, and identifying a document exception embedding in the one or more messages for further rendering of the document exception embedding; sending the rendered one or more messages such that the one or more messages appear to be sent by the decisioning party. In an embodiment, tasks may further include an information exception embedding. In an embodiment, the information exception embedding details a difference between the one or more documents requested by the decisioning party at a point of time, and the current state of the one or more documents. In some embodiments, the information exception embedding further includes: one or more documents the requesting party expects but has not received; metadata the received one or more documents; whether or not the one or more documents has been validated; commentary from the requesting party regarding errors on the document; and uniform resource locator ("URL") links to further information on the information exception embedding not directly visible in the embedding but can be accessed through the URL. In various embodiments, the information exception embedding represents the embedding at a fixed point of time and the information exception embedding represents the embedding in real-time.

In another aspect, the disclosure provides one or more non-transitory computer-readable storage media storing: a document processor comprising sequences of stored program instructions organized as a main service and a plurality of model-hosting services, the model-hosting services implementing a plurality of different trained machine learning classifiers and/or inference models, the stored program instructions of the main service being configured when executed by one or more computing instances of a virtual computing environment to cause the one or more computing instances to execute: receiving a digitally stored electronic document; invoking the model-hosting services to execute automatically inferring at least a subject and a date in the electronic document, and based on the subject and the date, automatically inferring nonconformity with one or more exception conditions based on one or more inference models; creating and storing a record of the electronic document in a system of record, the record being marked as needing an intervention; a multi-channel communication controller comprising sequences of stored program instructions which when executed by the one or more computing instances of the virtual computing environment cause the computing instances to execute: receiving the record of the electronic document; receiving and digitally storing in a digital data store, a first task comprising an outbound message directed from a first account to a second account, the first task being associated with a message template, one or more recipients, one or more communication channels, one or more events, and an information exception embedding specifying a state of the electronic document based on the record being marked as needing an intervention; determining that at least a particular event among the one or more events has occurred, and in response thereto, retrieving the message template, forming one or more electronic messages for the one or more communication channels of the first task, populating the message template with message contents including calling a customer relationship management system (CRM) to retrieve one or more values corresponding to categorical message recipients of the message template and replacing the categorical message recipients of the message template with the values, and rendering the information exception embedding into the message contents; automatically transmitting the one or more electronic messages on the one or more communication channels specified in the task; each of the sequences of stored program instructions of the document processor and the multi-channel communication controller comprising sequences of program instructions configured to execute in one or more environments in interoperation with libraries in the virtual computing environment. In some embodiments, one or more of the different inference models may comprise machine learning classification models.

In particular embodiments, each of the sequences of stored program instructions of the document processor and the multi-channel communication controller may comprise sequences of JAVASCRIPT program instructions configured to execute in one or more NODE.JS environments in interoperation with REACT libraries in the virtual computing environment.

In one feature of this aspect, the document processor further comprises sequences of stored program instructions which when executed by one or more computing instances of the virtual computing environment cause the computing instances to execute one or more of: using the digitally stored electronic document, automatically inferring one or more subjects and named entities specified in the electronic document and storing, in the record of the electronic document, references to one or more entities that are identified in the CRM system and that match the one or more subjects; using the digitally stored electronic document, invoking the model-hosting services to automatically categorize the electronic document according to an ontology and to index the electronic document in the system of record; using the digitally stored electronic document, automatically inferring a time range that the electronic document.

In another feature, the document processor further comprises sequences of stored program instructions which when executed by one or more computing instances of the virtual computing environment cause the computing instances to execute: receiving input representing an expert judgment; storing the input in the record of the electronic document of the system of record; appending the input to one or more training datasets that are associated with the inference models.

In yet another feature, the multi-channel communication controller further comprising sequences of stored program instructions which when executed by one or more computing instances of the virtual computing environment cause the computing instances to execute the rendering the information exception embedding into the message contents by: polling state data of the system of record and the document processor to retrieve one or more information exceptions; replacing a placeholder variable in the message with plain text, images and/or markup language text encoding a user interface detailing the one or more information exceptions in one or more formats corresponding to the one or more communication channels.

In still another feature, the multi-channel communication controller further comprises sequences of stored program instructions which when executed by one or more computing instances of the virtual computing environment cause the computing instances to execute the rendering the information exception embedding into the message contents by: polling state data of the system of record and the document processor to retrieve one or more information exceptions; replacing a placeholder variable in the message with source code that is programmed to cause fetching the one or more information exceptions from the system of record and the document processor and to dynamically render a user interface detailing the one or more information exceptions in one or more formats corresponding to the one or more communication channels.

In an embodiment, the multi-channel communication controller further comprises sequences of stored program instructions which when executed by one or more computing instances of the virtual computing environment cause the computing instances to execute: receiving and digitally storing in the digital data store, a definition of a journey comprising an ordered workflow of a plurality of tasks comprising at least the first task linked to a second task, the second task comprising a second outbound message directed from the first account to the second account, the second task being associated with a second message template, one or more second recipients, one or more second communication channels, and one or more second events; determining that at least a second particular event among the one or more second events has occurred, and in response thereto, retrieving the second message template, forming one or more second electronic messages for the one or more second communication channels of the second task, populating the second message template with second message contents including calling the customer relationship management system (CRM) to retrieve one or more second values corresponding to second categorical message recipients of the second message template and replacing the second categorical message recipients of the second message template with the second values; automatically transmitting the one or more second electronic messages on the one or more second communication channels specified in the task. In one feature, the document processor further comprises sequences of stored program instructions which when executed by one or more computing instances of the virtual computing environment cause the computing instances to execute automatically transforming one or more pages of the electronic document to enhance legibility. In yet another feature, the one or more exception conditions specifying any of absence and/or existence of a signature; a signature block matching the name of the requestor; and a document execution date within a specific time range.

2. Structural & Functional Overview

Careful examination of the commercial loan origination and subsequent monitoring processes reveals a recurring loop (termed the "canonical decisioning loop" in this disclosure) that occurs between the bank and the borrower(s). The loop is as follows:

1. The bank will request "information and consents" from the borrowing entity, its affiliate entities, owners, key leaders and/or other associates (collectively, "the borrowing party" or "the requesting party"), in addition to optional information from third-party services.

2. The bank will analyze and interpret the retrieved information.

3. The bank will then decide on the information, which often implies returning to Step 1.

It is important to note that these "information and consents" are typically managed and presented in the form of digitally stored electronic documents, which may or may not be structured and vary in their formatting. Some example documents include: Agreements which members of the borrowing party will have to sign (for example a non-disclosure agreement); Forms which the borrowing party will have to populate (for example personal information forms); Documents which the borrowing party will have to they will have to share (for example financial statements, copies of tax returns).

Regardless, different implementations of the aforementioned canonical decisioning loops are present in almost every lending institution lending to companies, and oftentimes a single process may contain various repetitions of this loop. For example, consider the following illustration of the origination process for a hypothetical $10 million business loan at a bank:

1. A loan sales agent determines a company has an unmet financing need, and requests about 25 documents from the borrowing party to estimate whether or not the financing opportunity meets the bank's credit appetite.

2. If the decision in (1) is affirmative, an underwriting agent now requests an additional five documents and the answers to outstanding questions from the borrowing party. In addition, the underwriting agent retrieves another five documents or non-document data from credit and risk data providers in the background. Together, the third-party and borrower data are used to confirm whether or not the bank will be able to assume the risk of the financing opportunity.

3. If the decision in (2) is affirmative, a closing agent now requests an additional 52 documents from the borrowing party. In addition, the closing agent requests another three documents in the form of appraisal reports from property appraising, environmental monitoring agencies and business appraising agencies. Together, the third-party and borrower data are used to confirm whether or not the borrower and bank have both mitigated any outstanding risks prior to closing/disbursement of the funds.

Note that the documents in the above steps are a combination of bank forms members of the borrowing party will have to sign (for example a non-disclosure agreement), forms they will have to fill out (for example personal information forms), and documents they will have to share (for example financial statements, copies of tax returns)

While the above example shows the "decisioning loops" of a particular loan origination, it is worth noting that these loops are also present during subsequent monitoring and servicing of the loan, as well as with on-boarding of other financial products that are not necessarily loans but still require risk measuring and mitigation. For example, similar decisioning loops are performed by the bank when on-boarding a company to a depository facility expected to make a large volume of transactions. Thus, the use of the term "borrowing party", while illustrative, does not cover the full scope of the system's use cases. This disclosure hence uses the term "requesting party", where the requesting party is expected to comprise several requestors, each of which is a relevant person affiliated with the organization requesting a financial facility from the bank (the "requesting organization"). As an illustrative example: a requesting party could comprise a company's CEO, CFO, multiple owners, and third-party accountant. "Party," in the description of solutions herein, refers to computers or accounts and not human individuals.

Similarly, even though the examples above used a bank, these canonical decision loops are present at several types of institutions (most of them financial institutions) that may or may not have a banking charter, which implies the scope of the system extends beyond banks. This disclosure will thus use the term "decisioning institution" or "institution" to refer to the institution responsible for the decisioning and/or underwriting process, and "decisioning party" or "agents" to refer to the individuals affiliated with the institution (for example bank employees or third-party attorneys) and their computers or accounts that are participating in a given set of decisioning loops. It is understood that the decisioning party may be the party requesting information as part of the decisioning process s.

Finally, it is worth noting that, in practice, the decisioning loop often involves participation of independent third parties acting on behalf of the decisioning and/or requesting parties. For example, a borrower and lender alike may include third party attorneys or appraisers to assist in the preparation of documents or acquisition/release of additional information. For the sake of simplicity, this disclosure treats the independent third parties whose services and participation are solicited by either the decisioning or requesting parties as being part of the decisioning and requesting parties themselves, respectively.

In one extreme, there has been much innovation in the field of fully (or nearly-fully) automated solutions for the decisioning loop. Such examples include online web-enabled portals where requesters can input their information and the application's back-end can automatically analyze the information, make an assessment, and finally determine which additional documents and data are needed to continue the decisioning process. ONDECK and KABBAGE are two example companies that have deployed this technology in a commercial lending setting, and they have found a good fit in the small business lending sector.

As the decisioning loop grows in complexity and size, which typically occurs when the size of the credit facility or the underwritten assets grow, fully automated solutions can become impractical and decisioning institutions typically switch to a human-driven process. Both during loan originations and servicing, institutions leverage a number of technologies to assist in this human-driven process. Aside from systems-of-record, sophisticated institutions will also have document imaging solutions, which are content management systems that assist lending agents with the intake, preparation, and publishing of credit, financial and/or legal documents in both digital and physical media. These document imaging solutions commonly integrate with systems of record, often from the same vendor. One such example is FINASTRA'S FUSION LASERPRO product.

In order to drive and manage the decisioning process, decisioning agents at sophisticated institutions will also use a customer-relationship-management (CRM) solution such as SALESFORCE or NCINO. CRM solutions allow lenders to maintain a record of the various relationships the lending institution has formed, create workflows associated with the various products they offer (for example a loan application), track each relationship as it progresses across various institution-specific workflows, and measure conversion rates at various stages of each process.

In addition, agents participating in underwriting and other credit risk assessments typically use systems that assist with the visualization, aggregation, computation, and interpretation of information that was retrieved from the borrowing party. These include financial spreading solutions like MOODY'S Risk Calculator or value calculators like Q2's PRECISION LENDER software. Some of these systems have the ability to directly retrieve relevant data from within documents using optical character recognition (OCR) routines and store it in the appropriate place for aggregation or computation purposes. One such example is NCINO's automated spreading technology.

Decisioning institutions may also have a borrower-facing web portal for documents and other information exchange. More typically, institutions use "data room" services such as SHAREFILE and IDEALS for this purpose. However, some lending institutions have branded portals that not only can be used to share arbitrary documents but can specifically let the borrower know which documents are needed as well as if a submitted document has been reviewed and/or validated by an agent in the lending institution. Finally, the decisioning institution may have a marketing or sales engagement tool that can assist with automated or -semi automated communications with existing or prospective relationships.

Financial institutions also use many other technologies that are not within the scope of this disclosure. Examples include core banking systems like those provided by FIS, FINASTRA and FISERV, as well as pricing software such as Q2's PRECISION LENDER.

Further, there are other technologies that are not common in decisioning institutions but are relevant to this disclosure. There exist content management solutions that permit organizations to create templated messages and documents where specific portions of the document can be populated with personalized information prior to publication. One such example is the TEMPLAFY content management system (CMS). Similarly, there exist marketing automation tools such as SALESFORCE PARDOT which allow users to create marketing campaigns using templated content and have said campaigns be executed on behalf of the campaign's identity in a semi-automated basis. Users of this software can create campaigns that are composed of individual templated messages (typically email messages) where variable attributes (such as the recipient's first name) are automatically inputted prior to sending the message. These tools will typically also collect analytics data on the message to provide the campaign manager with performance metrics (typically measured as a function of buyer intent or response rate) and allow them to compare the performance of different campaigns.

2.1 Problems in User Experience

Despite the abundance of the technology described above, the origination, monitoring, and other decisioning processes of most lending institutions remain highly cumbersome for a number of reasons, one of being the requirement for manual labor. When receiving documents, agents must do the following:

Validate the document's content to check for exceptions to internal policies (for example check for spelling mistakes, identify the existence of appropriate signatures, verify the date of the document's execution matches expectations);

Organize, annotate, and rename the documents according to the lending institution's internal ontology or that of its system of record;

Identify and document key attributes about the document, such as document execution dates or time ranges the document represents;

If necessary: segment, merge, rotate or otherwise transform various document pages so as to enhance their legibility and allow for posterior storage according to the institution's ontology.

As another example, inefficient information transactions are an obstacle to efficient decisioning processes. While the idealized decisioning loop involves a single request for information, paired with a single response, in practice the request for documents and information can be a cumbersome, multi-step transaction that necessitates back-and-forth communication for a number of reasons:

Clarifications and context are often needed by the relevant person in the borrowing party when submitting information.

Clarifications and context are often needed by the relevant person in the lending institution when interpreting the received information.

The lending agent interpreting or requesting information will often not have a relationship with the borrowing party and may thus prefer to route communication through the relationship manager.

The member of the borrowing party submitting information will often not have a relationship with the lending institution and may thus prefer to route communication through the primary borrowing contact.

Members of the borrowing party often perform invalid or incomplete document submissions.

Information provided that was valid when originally submitted will often become stale or outdated before the process concludes.

Inconsistencies in messaging (for example, what an institution's online portal may ask for vs. what a person in the lending institution may verbally require) often lead to missing or superfluous document submissions.

Lapses in memory or task abandonment by either borrower or lender will result in duplicative communication efforts by multiple members of the party.

While the lending institution may have a number of technologies that assist with the proper organization of documents (for example, a borrower-facing portal that enumerates the information needed), there may be significant reluctance from the borrowing party to leverage said technologies and instead use more traditional or familiar channels, such as email or SMS, to exchange information Finally, some technologies and innovations that could assist with the process (for example, automated email reminders from a central email address and server) remain out of favor with institution as they may lead to a degraded borrower experience that does align with the high-touch, personalized environment institutions want to foster for its high-value clients (for example, if the borrower is expecting to deal with a lending executive or his personal banker instead of an automated system).

Despite the abundance of technology, the problems outlined above mean that the information-collecting portion of the decisioning loop remains a major source of friction and resource expenditure.

2.2 Fundamental Inadequacies of Existing Technological Systems

At their core, all of the aforementioned problems in the decisioning loop can be traced to three fundamental gaps with existing technology systems, which are detailed below:

1. The global state of information reflected by the decisioning party's systems of record does not always reflect the true global state of information.

2. The global state of information as visible to one member of the decisioning or requesting parties, or a subsection of said global state, can disagree with the global state of information as visible to a different member.

3. State transitions which could be performed instantaneously are instead performed manually over time, leading to further gaps between the true state and the interpreted state.

In order to describe the above fundamental flaws, one must first define what is meant by "global state of information" and "state transitions." Typically, when the decisioning institution requests some datum from the requesting party (for example a document such as a personal tax return), the datum will undergo several canonical state transitions:

NEEDED: first, the datum is identified as needed by the decisioning party in order to close the decisioning loop. For example, an underwriter can decide they want to use a personal whole life insurance policy as collateral for a new business line of credit, which triggers the bank to require a copy of said insurance's agreement documentation from the policy holder. The characteristic identifier of this state is that it requires action on the part of the requesting party in order to transition into the next state.

RECEIVED: second, the datum is received by the decisioning party once it is in the control of any of the decisioning party's members. For example, the insurance policyholder will send the loan officer a copy of their insurance agreement, at which point the decisioning party is in control of said datum. The characteristic identifier of this state is that it requires action on the part of the decisioning party in order to transition into the next state.

VALIDATED: third, the datum is validated once a member of the decisioning party identifies it as conforming to internal policy requirements. For example, a compliance officer at the bank may want to verify that the received insurance agreement has been signed by the appropriate parties and that the insurance policy agreement allows for changing of its beneficiary. The characteristic identifier of this state is that it needs no further action by either requesting or decisioning party. In the event the datum does not conform to the internal policy requirements, it is once again needed as it requires intervention of the requesting party.

FIG. 1A illustrates a block diagram of possible states of each individual datum. In one embodiment, FIG. 1A illustrates a state transition diagram for data that is submitted to the decisioning party by the requesting party.

FIG. 1A, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

In the example environment 100, a datum with the state of needed 102 may be identified as needed by the decisioning party in order to close the decisioning loop. The characteristic identifier of the datum state needed 102 is that it requires action in part of the requesting party in order to transition into the next state. For example, in one embodiment, a loan underwriter may decide they need a life insurance policy as collateral for a new business line of credit, which triggers the bank to require a copy of the insurance agreement documentation from the policy holder. In this case, the copy of the insurance agreement may be classified as datum with a state of needed 102. Datum with a state of needed 102 may then be submitted to the decisioning party by the requesting party, wherein the datum may be indicated as datum with a state of received 104.

Datum is marked with a state of received 104 by the decisioning party once the data is in the control of any of the decisioning party's members. For example, the insurance policyholder sent the loan officer a copy of the insurance agreement, at which point the decisioning party is in control of said datum, and thus the datum may be indicated as datum with a state of received 104. Datum with a state of received 104 that does not satisfy a plurality of requirements may undergo an additional canonical state transition and be passed back to the needed state 102.

An identifier of the datum with a state of received 104 state is that it requires action in part of the decisioning party to transition the datum into the next state, namely a datum with a state of validated 106. Datum may be indicated with a state of validated 106 once a member of the decisioning party identifies the datum as conforming to internal policy requirements. For example, a compliance officer at the bank may want to verify that the received insurance agreement has been signed by the appropriate parties, and that the insurance policy agreement allows for changing of the beneficiary. A characteristic identifier of the datum with a state of validated 106 is that it needs no further action by either the decisioning or requesting party.

Furthermore, an additional state (the "sent to requesting party" or "sent" state) may exist in the event that the decisioning party needs to send data to the requesting party before it can be once again received, as shown in FIG. 1B. FIG. 1B illustrates block diagram of an example system 110 of a state transition diagram for datum needed 102, datum sent 112, datum received 104, and datum validated 106. In one embodiment, datum needed 102 may be identified as needed by the decisioning party in order to close the decisioning loop. An additional state, the datum sent 112 state, may be triggered in the event that the decisioning party needs to send data to the requesting party before it may be received in the datum received 104 state. For example, if the decisioning party needs to send a loan agreement to the requesting party for signature by all guarantors, this may represent the datum sent 112 state. When the decisioning party is in control of said datum, the datum may be indicated as datum received 104. Datum received 104 but does not satisfy a plurality of requirements may undergo an additional canonical state transition and be passed back to the datum sent 112 state. An identifier of the datum received 104 state is that it requires action in part of the decisioning party to transition the datum into the next state (datum validated 106). Datum may be indicated as validated 106 once a member of the decisioning party identifies the datum as conforming to internal policy requirements. A characteristic identifier of the datum validated 106 state is that it needs no further action by either the decisioning or requesting party.

The states defined in FIG. 1A and FIG. 1B present a generalized representation of information states. In practice, many institutions have implemented programs, workflows or policies that capture many of these same states using different words or slightly different definitions so as to fit their particular business needs. The definition of these state transitions is agnostic to specific implementations made in a business setting and is instead used to describe the problem in a generalized manner.

Having defined the possible states of a datum in FIG. 1A and FIG. 1B, the global state of information may be defined as the union of all data in their individual states. In other words, the global state comprises all data that are in the states of needed 102, sent 112, received 104 and/or validated 106 between the requesting party and decisioning parties and/or their accounts or computers. With the above two definitions of global state of information and state transitions, the inadequacies of certain prior-art technologies and the improvements of the present disclosure will be apparent.

Consider a situation where a decisioning institution offers their requestors the ability to submit documents via either an online portal (the "requestor portal") or directly to a decisioning agent's email inbox. In this case, the requestor portal is connected to the bank's internal system-of-record and can display which data have already been received and which are still needed according to the system of record. In one embodiment, assume that a member of the requesting party submits a document (for example a business tax return) to the decisioning agent's email inbox. In theory, because the document has been received by the decisioning party, it should transition into the received state 104 as it no longer needs action by the requesting party, but rather the decisioning party. However, the fact that the decisioning agent needs to manually upload this document to their system of record, implies that, even though the document is truly received 104, it will still be recorded as needed 102 until the decisioning agent performs said upload. Thus, the requesting party would still see the document as needed 102 in the online portal for some time, leading to confusion and a degraded experience for the requestors.

More generally, with today's technology, data that is truly received by the decisioning party must be propagated with human intervention to the various systems the decisioning party uses to store and share this data in order for it to be recorded as with the received state 104. Oftentimes, this propagation may involve various members of the borrowing party transferring the document between each other (for example via email forwarding) or uploading into specific systems (for example to their CRM or system of record). The delay in this propagation, whether due to the time involved in performing it or the time needed to become aware of the propagation task, accounts for many of the problems in user experience defined in previous sections.

The above problem is also pervasive with true validations or invalidations in comparison to recorded validations or invalidations. For example, assume that the tax return submitted by the requesting agent is, in fact, a valid one: it has all the necessary fields populated, it has a signature at the bottom, and it corresponds to the legal entity being examined by the decisioning party. In this case, it is evident that the document is truly valid as it should need no further action from the borrowing and decisioning parties. However, because today's technology still forces the decisioning agent to manually perform the right validations, the document will be recorded as having the received state 104 (or worse, as having the needed state 102) until a decisioning agent validates the document and records this validation in their systems of record. At that point, the document transitions to the validated state 106. There is thus a consistent gap between the true state of information and that which is recorded and shared with other members of the decisioning and requesting parties.

Some technologies allow for automated transfer of data from a requestor portal into a centralized data store. However, the fact that much of this data may be exchanged through different digital channels (for example sending documents through email, fax or SMS) implies that there will always be a difference between the true states and the recorded states, unless a single system somehow becomes capable of automatically ingesting all of the data from the various channels it could be exchanged through.

The aforementioned need to manually propagate information from various channels into different systems of record further compounds problems as it does not guarantee that any two members of the decisioning or requesting parties will share a common understanding of the global state of information. For example, a borrower may email a loan officer her personal tax returns, but unless the loan officer uploads these returns to a specific system, the borrower may still be asked to provide that information by the underwriter, who was unaware of the information exchange. Similarly, one member of the borrowing party ("A") may accidentally remind another member ("B") to submit information that, unbeknownst to A, was already submitted to the decisioning institution by B through a different channel than expected. These problems are pervasive in decisioning loops involving multiple participants and fully unaddressed by today's technology.

In addition, the need to perform certain state transitions manually when they could be automated leads not only to loss of worker productivity but also significant delays in the decisioning loop that could be avoided altogether. In particular, transitioning data from the "received state 104" to "validated state 106" or "received state 104" to "needed state 102" states currently requires expert intervention that sometimes takes place multiple days after data is initially received by the decisioning party, and this delay contributes to the issues described above. For example, consider the following scenario involving an invalid tax return:

Bank decides to include a partial business owner as a guarantor. According to bank policy, this implies the bank will need the business owner's most recent signed personal tax returns for underwriting purposes (datum now "needed state 102").

A loan officer from the bank requests the needed document from the potential guarantor and receives a response within 24 hrs. The loan officer files this tax return into the system of record ("needed state 102" to "received state 104").

By bank policy, all personal tax returns must include a signature. Days after the document is received, a back-office agent from the bank identifies that the tax return is missing a signature, meaning the datum is actually invalid ("received state 104" to "needed state 102").

The back-office agent now informs the loan officer that the submitted document is invalid. The borrower, who thought they had submitted the right document, is once again prompted by the loan officer for a signed copy of the tax return filings. Unfortunately, the loan underwriting process is blocked at this stage until signed documents are received.

Two days later, the borrower returns the appropriate version of the document (a signed copy) and the process is once again unblocked, having accumulated a delay of at least two days due to this issue ("needed state 102" to "received state 104")

Finally, the correct format of the document is validated by the back office and determined to be fit for underwriting purposes ("received state 104" to "validated state 106")

In the above scenario, the bank's requirement to manually validate a document, coupled with a human error in part of a member of the requesting party, resulted in a two-day delay to the process in addition to duplicative communication efforts by the decisioning party. Aside from preventing human error altogether, the only way to prevent this broken experience would be to make the "received state 104" instantaneous. That is, what is needed is computer-implemented means to automatically verify whether or not a document is valid according to the bank's policies and immediately notify the requester of potential issues.

2.3 Overview of Solution

In an embodiment, a single computer-implemented system solves all three of the aforementioned gaps in existing technical systems. Descriptions of the major innovations that achieve this can be found below:

In one embodiment, a distributed computer system under stored program control is capable of automatically validating most data received by the decisioning party as soon as it reaches the decisioning party through any of the digital communications channels used by the party (for example email, SMS and/or a web portal). Data that is bound to be validated thus can transition from the "received state 104" to "validated state 106" states practically instantaneously, and data that is bound to be invalidated also transitions from the "received 104" to "needed 102" states in a near-instantaneous fashion. The system is capable of doing this by automating various document identification, categorization and validation tasks typically performed by an agent of the decisioning party. Notably, the system achieves this through the use of various statistical learning models within a human-in-the-loop ecosystem that is connected to the decisioning party's various communication channels. Thus, the system is capable of showing a view of the global state of information that is more loyal to the true global state of information.

In cases where all the identification, categorization and validation steps can happen automatically (for example the statistical learning models involved all make inferences with high confidence scores), the intermediate "received state 104" is never apparent to members of the requesting or decisioning parties, which practically reduces the two or three-state generalized models into two or three states in the eyes of the users or other programs or systems. For example, a document that is certain to pass validation because it satisfies the decisioning party's business rules will automatically be validated as soon as it is received. Similarly, a document that is certain to fail validation (for example if a required signature is missing) will be automatically transitioned from the "received state 104" to the "needed state 102" or "sent state 112". This implies the "received state 104" of a document often becomes moot to the end-user, greatly simplifying the decisioning process in a novel way.

In cases where a subset of the steps require human intervention (for example if the machine learning models do not reach a sufficiently high confidence score in their inferences), the system is programmed to present the data to accounts or computers of members of the decisioning party who can properly categorize or validate records these interventions in the form of judgments for use in supervised statistical learning routines that can further minimize the need for human intervention in the future. This can guarantee progressive minimization of the number of times any document needs human intervention in the "received state 104".

Automated centralization and propagation of data: by integrating with the disparate communications channels that have been used historically to interface between decisioning parties and borrowing parties (for example the decisioning party's email servers), as well as the back-end systems the decisioning party uses to keep track of decisioning data (for example the system-of-record), the system is capable of generating output specifying a real-time representation of the global state of information that more closely matches the true global state of information. In the cases where all communications channels are integrated, the system can guarantee that the global state of information as viewed by any member of the decisioning or requesting parties matches the true global state of information.

Figure 2:
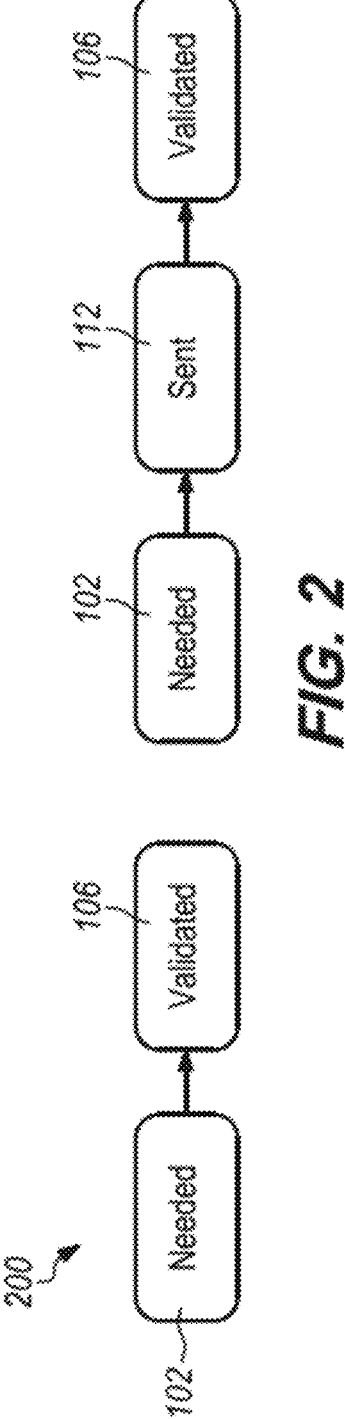
FIG. 2 illustrates an integrated state transition diagram for an embodiment.

FIG. 2 illustrates an integrated state transition diagram for an example embodiment 200. By integrating with the various channels and leveraging the abstractions mentioned in the system architecture, one embodiment may guarantee that members of the requesting and decisioning parties have the same view into the global state of information independent of the channel they access it with. For example, a borrower may receive an email from a decisioning agent indicating ten documents in the needed state 102 and twenty documents in the validated state 106, and be guaranteed that a different channel (for example, an online web portal for data submission) reflects those same precise documents in the needed state 102 and validated state 106.

2.4 System Architecture

At the highest level, the system is programmed to coordinate transactions of information between enterprise computers in the role of requesting party and computers or accounts of a decisioning institution. While the principal use case is for decisioning loops during loan origination and monitoring, the system can be used for other purposes that require one or more iterations of the canonical decisioning loop between the institution and the requesting party.

In one embodiment, a distributed computer system comprises one or more servers or server instances executing a web (HTTP/HTTPS) application consisting of a number of inter-connected software systems, which are integrated into a number of other third-party (external) systems that are commonly used by financial institutions participating in commercial lending. The application is structured under a client/server Software-as-a-Service (SaaS) architecture where the server-side systems are hosted either on cloud infrastructure wholly operated by the service provider or on public cloud infrastructure that is operated by the organization requesting the service, but can be managed by the service provider for the purposes of ensuring the system's functionality, security and availability.

The system also integrates with other back-end components. Components in this category are part of the software stack that decisioning parties use to manage the decisioning loop. Embodiments of the system may integrate with external/third-party implementations of these components or may implement a "native" version that is purpose-built for the embodiment. Integration may comprise using programmatic calls to invoke methods or functions through an API, remote procedure calls, a message bus, or other inter-program communication techniques.

The system-of-record (SOR) maintains a record of documents that the institution has on file about the borrowing party, as well as information on what additional documents may be needed in the process the party is undergoing (for example a loan application). At the highest level, the SOR may perform the following actions:

The SOR can digitally store, index, and serve document-based data about a borrowing party.

Given information about the borrowing party and/or the particular workflow the borrowing party has been assigned to (for example a loan application), the SOR can be queried to retrieve a result set of which documents are still needed by the institution to complete the requirements of the workflow or of a specific workflow stage.

The SOR can store and serve additional metadata about the documents it has on file. For example, historical versions of the document, logs of people who have viewed or approved the document, named entities present in the document etc.

A workflow/customer relationship management ("W/CRM") component maintains demographic/firmographic information about the various customer relationships in which the institution is in business (or potential business), contact information for one or more of the requestors, information on entities associated with that relationship (identifying data of people, places, companies, etc.), and an index of various workflows that the customer relationship can be assigned to (for example a loan application, a monitoring request, etc.). If assigned to a workflow, the W/CRM will additionally have information related to that relationship's progress within the workflow such as the current state and upcoming/necessary tasks and actions for the workflow. Finally, the W/CRM may maintain additional information about the relationship, such as historical conversations with members of the borrowing party, activity logs, and demographic/firmographic information about the borrowing party.

As with the SOR, the system can connect to a third-party CRM or use a built-in CRM component. At a minimum, the CRM can be queried to do any of the following:

Store and serve information regarding requesting organizations (customers) and/or individual requestors, including contact information as well as communication activity with each person.

Store and serve information regarding a relationship's status within a pre-defined workflow, (for example the various stages of a loan application), as well as metadata about the relationship's progress within the workflow (for example time at each stage).

Store and serve metadata about workflows, such as the tasks needed to complete the workflow, or that workflow's association with some financial instrument or facility (for example a loan or a depository account opening).

In financial institutions that deal with lending, workflows contained within the W/CRM are typically associated with a financial facility or instrument (for example a loan or depository account opening). In other embodiments, W/CRM workflows may be associated with other kinds of transactions or events that an enterprise manages or processes.

A content management system ("CMS") can be integrated into the system to manage content consisting of templated communications (for example email messages) and documents (for example term sheets) that are typically interchanged between agents of the financial institution and those of the borrowing party. The CMS can be programmed to perform the following:

Store and serve templates (template documents or template text for use in other channels), including metadata about the modifiable fields and segments of the template.

When provided with demographic, firmographic, or other information taken from the CRM, SOR or other sources, in response to a query, return populated templates or "rendered" documents that are ready for publication or dissemination.

In addition to connecting with platforms used exclusively by the decisioning party, the system is programmed to integrate with at least one, but ideally all, of the digital channels used for communication between members of the decisioning and requesting parties. Embodiments may integrate with external or third-party implementations of these components or may internally implement email, SMS, or other messaging protocols for this purpose.

In one embodiment, an email service may be used to manage email communications between various agents of the borrowing party and the lending institution. These can use any of a variety of protocols for email management such as IMAP, POPS, SMPT or custom protocols that achieve similar functionality (for example Google's Gmail). The application is only concerned with integrations to the decisioning institution's email service, hosted by them or by a third party servicing the decisioning institution.

Figure 5:
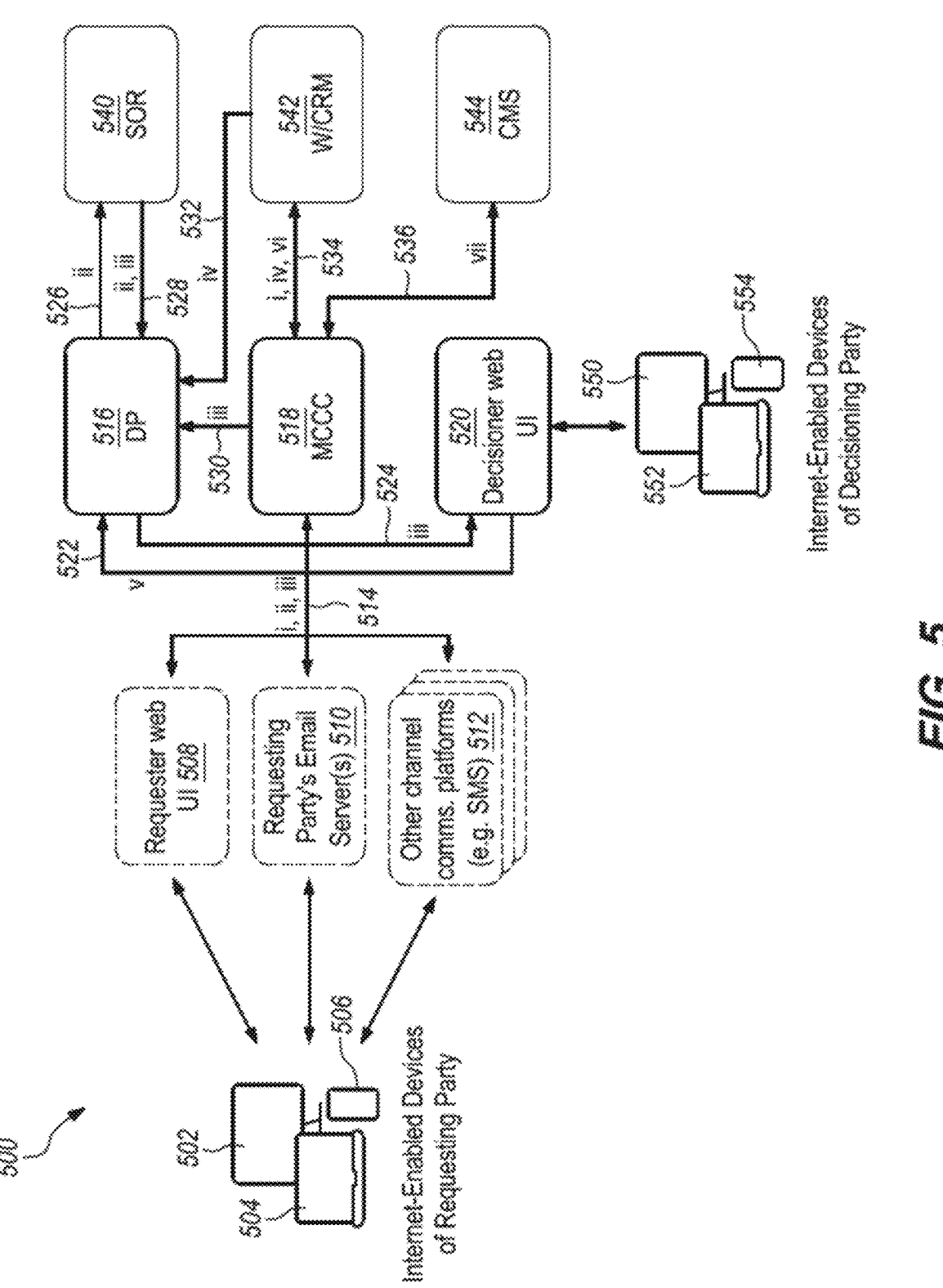
FIG. 5 illustrates a generalized representation of a computer system to implement one embodiment.

In one embodiment, an online web-based user interface such as requestor UI 508 of FIG. 5 may be hosted by the decisioning institution (or a third party servicing the decisioning institution) and acts as an interface accessible via a web browser where the requesting and decisioning parties can securely exchange information, including but not limited to documents and messages between individual members of the decisioning and requesting parties.

The SMS service is a platform hosted by the decisioning institution (or a third party servicing the decisioning institution) that enables the institution to send, receive and store communications in SMS format, including messages, images, and whole documents.

In some embodiments, other communications platforms may additionally integrate with other digital communications channels used to manage or conduct communications between members of the decisioning and requesting parties such as VOIP servers or video conferencing systems. The present system is solely concerned with channels whose platforms are hosted by the decisioning institution or a third-party servicing the decisioning institution.

2.5 the Document Processor

The first non-integrated, novel component of the system comprises a document processor which comprises sequences of stored program instructions which, provided any document and optional document metadata (such as the provenance of the document), leverages a number of computer vision routines and statistical learning models to perform the following actions:

Automatically infer the subjects and named entities (for example people, locations, businesses) mentioned in the document, and, when applicable, associate the document with the matching entities present in the W/CRM and/or SOR (relationships, leads, prospects, accounts, etc.). In an embodiment, code to associate the subjects may be programmed to store, in a record of the electronic document in the system of record, references to one or more entities that are identified in the CRM system and that match the one or more subjects, after transmitting to the CRM system a query identifying the subjects and configured to return a result set of the matching entities in the CRM system.

Automatically categorize, name, and index the document according to a canonical document ontology or an ontology enforced by the SOR that can be discovered and manually or automatically related to the canonical ontology.

Automatically duplicate, segment, merge, rotate or otherwise transform various document pages so as enhance their legibility and allow for storage according to the organization's ontology.

Automatically infer key date information such as the day the document was signed/executed, or the time ranges that document covers (for example a quarterly financial statement).

Automatically infer conformity or nonconformity with exception conditions as defined in a document exception policy, such as the absence or existence of a signature, a signature block matching the name of the applicant, or a document execution date within a specified timeframe.

When any of the automated transformation and inference steps fail, or whenever the inference routines do not have sufficient certainty on their inferences (as determined by an adjustable confidence parameter), mark the document as needing a lending agent's intervention on the correct transformation, category or association (that is, "the expert's judgments"), and hold in an internal store or third-party data store until the appropriate judgments have been made by an expert.

Provided an expert judgment, store this judgment as well as any contextual metadata associated with the judgment (that is, an explanation of why the document failed a certain validation) and use it to update the statistical learning models on a future statistical learning iteration. Judgments and their metadata may further be accessed in the future for the purpose of presenting them to members of the requesting party whenever a document transitions from the "received" to the "sent" or "needed" stages.

Once all necessary expert judgments have been made, the document can continue to be processed automatically (in the event further processing is required) or be stored in the SOR (in the event processing is finished) as mentioned in the step below.

Finally, store the processed documents and their associated metadata in the SOR.

When applicable, particularly if the organization's SOR lacks the ability to store metadata about a document alongside the document, the document processor may use an internal data store to maintain digital records of the various metadata components it inferred on each document stored in the SOR, including potential exceptions to the organization's document policies.

For simplicity, this disclosure refers to the collection of associations, transformations, or other inferences performed by the document processor as the "inferences". The superset of these inferences and other metadata that was already present in the document (or provided to the document processor) will be referred to as the "document metadata." The document processor connects to the various other components of the system as outlined below.

The document processor connects to the SOR to: Identify pre-existing ontologies in the SOR; Identify pre-existing patterns in document metadata and other document associations present in the SOR; Identify associations the SOR is already making between its stored documents and the entities, relationships and/or workflows contained in the W/CRM; Store processed documents and their metadata in the SOR; Ingest, process and update documents and metadata that were created or added to the SOR without having first passed through the document processor's (DP's) indexing and metadata extraction routines.

The document processor connects to the W/CRM to identify which relationships, entities, and workflows already exist within the organization and use these as association targets during inference routines. The document processor connects to the multi-channel communications controller ("MCCC"), as described below, to ingest documents, along with metadata on the document such as the documents provenance, for processing. Finally, the document processor may be accessed through the decisioning party's user interface (described below) for the purpose of: Displaying processed or unprocessed documents and their metadata; Modifying the inferences, transformations, and other metadata added by the document processor's algorithmic routines; Obtaining expert judgments on any of the documents that were not automatically processed or otherwise needed expert intervention.

2.6 the Multi-Channel Communications Controller

The second novel component of the system is a communications management system that integrates data found in all of the components previously mentioned, as well as the document processor, to assist with the automation of various communication tasks needed throughout the decisioning process in various novel ways. In an embodiment, a multi-channel communications controller interoperates with a plurality of data structures as now described.

Any decisioning agent may create a number of communication tasks, each intended to be an outbound message from a computer or account of the agent to the computer or account of one or more members of the requesting or decisioning parties. Each task may be associated with at least the following information:

1. One templated message, which can be retrieved-from and stored-in the CMS. Templated messages contain a combination of text, which can but does not need to be a markup language encoding such as HTML. The message itself may contain zero or more variables, which encode attributes found in the W/CMS and/or SOR that will be fetched when the task is executed, such as the recipient's first name or the current stage within the workflow.

2. One task owner, defining the agent from which the message will come from.

3. One or more categorical message recipients (for example "all personal guarantors", "main borrower", "financial contact", "relationship manager") representing members of the requesting or decisioning parties.

4. One or more channels through which the message will be disseminated (for example email, or borrower web portal).

5. One or more triggers that will cause the task to be either surfaced or executed, where the triggers are specific events or compositions of events. An event is defined as any change (or lack thereof) to the internal state kept by SOR, the document processor or the W/CRM. For example: the addition of a new document into the SOR, the transition of a relationship within one stage to another of a workflow within the W/CRM, or the absence of new information in the SOR after some predefined period of time. Tasks may be defined to immediately execute or instead be surfaced upon triggering. When a task is surfaced, the task owner is simply prompted to execute, modify or skip (move to the next task without executing this task) the task upon triggering. The user may select a "manual" trigger if so desired, such that the task can only be surfaced or executed on-demand. Finally, the user may request the task.

6. Zero or more information exception embeddings (further defined below), which represent a real-time or fixed-time snapshot of the information the lending institution needs at any point time for some arbitrary workflow.

Tasks may then be composed together in sequential or parallel order to form journeys, which ensure execution of tasks can only occur in a certain order from the time a journey starts until the journey concludes. Each task in a journey may itself use information from a parent task as part of its triggering conditions. Journeys themselves may be associated with workflows from the W/CRM. It is important to note that tasks and journeys (which represent automated or semi-automated communications steps) are independent of, but can be associated with, the various workflow steps defined in a W/CRM. For example, a task can be triggered when a relationship in the institution's W/CRM is transitioned from the "underwriting" to the "closing" stages of some workflow.

Figure 3:
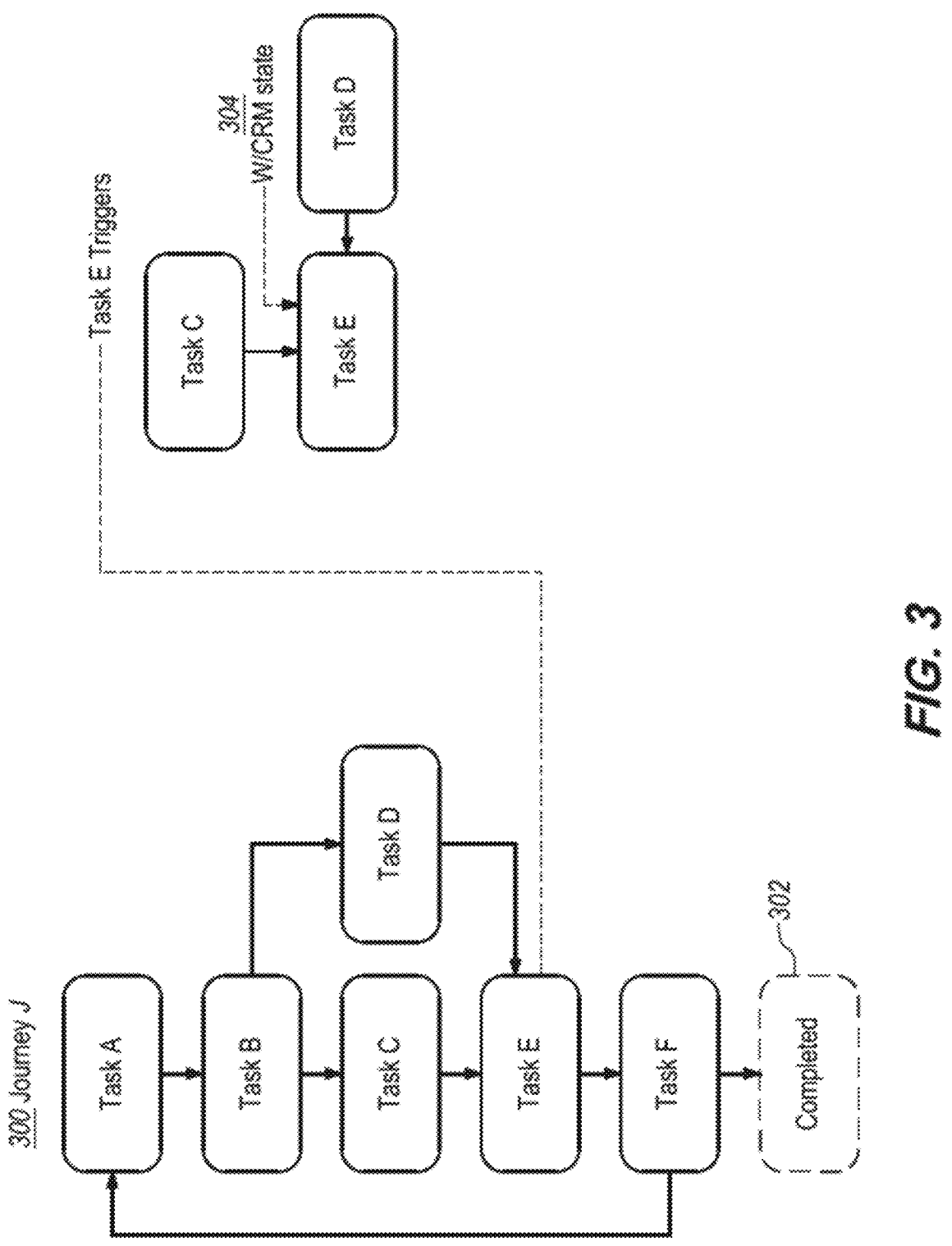
FIG. 3 illustrates a directed graph representation of journeys, tasks, and their functionality.

Users may create an arbitrary number of different journeys, each of which codifies a composition of tasks running in series or in parallel. Since tasks can have more than one trigger and the completion of a task can trigger a different task, it is assumed journeys can be modeled as a directed graph, as shown in FIG. 3. FIG. 3 displays an example embodiment of a graph representation 300 of journeys, tasks, and their functionalities. As outlined above, each task may be associated with information intended to be one or more outbound message from the employee to one or more members of the requesting or decisioning parties. In some embodiments, tasks may be composed together in sequential or parallel order to form journeys, which ensure execution of tasks may only occur in a defined order from the time a journey starts, until the journey is completed at block 302. As demonstrated in FIG. 3, journeys may be associated with workflows from the W/CRM. It is understood that journeys, which represent automated or semi-automated communication steps, are independent of but may be associated with a W/CRM state 304. For example, a task, such as Task A, may be triggered when a relationship in the institution's W/CRM is transitioned from the "underwriting" to "closing" stages of some workflow. It is understood that tasks may have more than one trigger and the completion of one task may trigger a different task. As demonstrated in FIG. 3, the triggering conditions for Task E are execution of Task C, execution of Task D, and the W/CRM indication that the relationship is in the "Underwriting" stage.

In particular embodiments, Journeys may represent a cyclic graph of one or more tasks, wherein not all of which may result in an outbound message. As an example and not by way of limitation, if a first task of the Journey is a null (e.g., "BEGIN" task), a second task may contain a first message. For example, tasks may be conditionally triggered, and a manual (e.g., "execute") instruction may be a viable or acceptable condition. As an example and not by way of limitation, a journey may be a personalized email campaign, programmed to send a new email to the user every three days unless the user responds to one or more emails in the email campaign. As another example and not by way of limitation, a journey may be a personalized email campaign instructed to send out one or more emails to one thousand leads retrieved from a CRM. In this case, the email may contain a personalized message, wherein the personalization attributes were retrieved from the SRM. In these examples, the email campaign may be fully automated. However, if the user wants to only party automate the email campaign, the workflow may be considerably more complex. In this case, the user may have to constantly refer to the state of information and/or document requests, which requires the user to monitor email, the W/CRM, and a plurality of other communication channels through which documents have arrived/been uploaded (e.g., a borrower/requestor portal, a share file system). Thus, the present embodiment may provide a system for tracking the state of one or more requests across various components (e.g., global state), and also simultaneously publish this stat across the various communication channels the user may be participating with to submit and/or view information.

Finally, users may decide to incorporate into any task an information exception embedding (hereafter "embedding") that details the difference between the corpus of documents that the decisioning institution needs at some point of time and the current state of those requested documents (that is, the "exceptions"). The data displayed in this embedding includes, but is not limited to, documents that the institution expects but has not yet received, as well as metadata on received documents, such as whether or not it has been validated, commentary from a decisioning agent regarding errors on the document, or URL links to further information on the exception that may not be directly visible in the embedding but can be accessed through the URL. The embedding is an abstraction that can be pre-defined during task creating and performs just-in-time rendering of the exceptions upon task execution. It is understood that the embedding may be either a snapshot of the exceptions at a fixed point of time, or a real-time view of the exceptions. The embeddings implementation, particularly in its use as part of a message between decisioning and requesting agents, is novel and will be defined in items below.

It is understood that each of the above data structures have certain functionalities associated with them, which are described below:

When sending communications to the requesting party, the multi-channel communications controller ("MCCC") is designed to impersonate or act on-behalf-of one or more of the decisioning agents. For example, emails sent to a requestor appear as coming directly from a decisioning agent's personal inbox. In one implementation, the MCCC is programmed to instantiate, in MCCC memory, an email message in which the decisioning agent is specified as the FROM: sender value, and invoke a mail transfer agent (MTA) coupled to the MCCC to transmit the message, rather than invoking or using the decisioning agent's email client. Similarly, SMSs sent appear to come from a personal phone number, and messages routed to the external web portal appear as authored by the decisioning agent and not an automated system. The embodiment is agnostic to the precise mechanisms of impersonation; the example section showcases at least one.

The MCCC further has access to some or all of the messages that the requesting party sends to a decisioning agent when performed across the channels that the MCCC monitors. When a message arrives through any of the monitored channels, the MCCC will automatically route the text of the message to the W/CRM and log it as an activity under the appropriate relationship(s), automatically route any documents that came through the channel for further processing, and log the activity in an internal store (which would be needed, for example, for tasks requiring an incoming message event to trigger them). Aside from monitoring communications channels, the MCCC periodically polls the W/CRM, the SOR, and its internal store to obtain the present state of the system and determine if any presently active journeys have tasks that should be triggered.

When a journey is created by the agent, it acts as a reusable component that can be attached to any of the relationships found in the W/CRM. One says an arbitrary journey "J" can be attached to some relationship "R" by creating a copy of the journey at the initial state (with all tasks un-executed) and assigning it to R. At that point, it is said that "journey J is active for the relationship R". The journey's tasks can then be executed for that relationship, according to the triggers in each task, until all tasks conclude their execution, or the journey is forcefully detached from the relationship. At that point, one can conclude "journey J is inactive for relationship R."

The above structure implies that: A single relationship may have zero or more active journeys; A single journey may be active for zero or more relationships simultaneously; Each active relationship and journey pairing is independent and may have a different set of executed and unexecuted tasks at any given point of time.

Figures 4A, 4B:
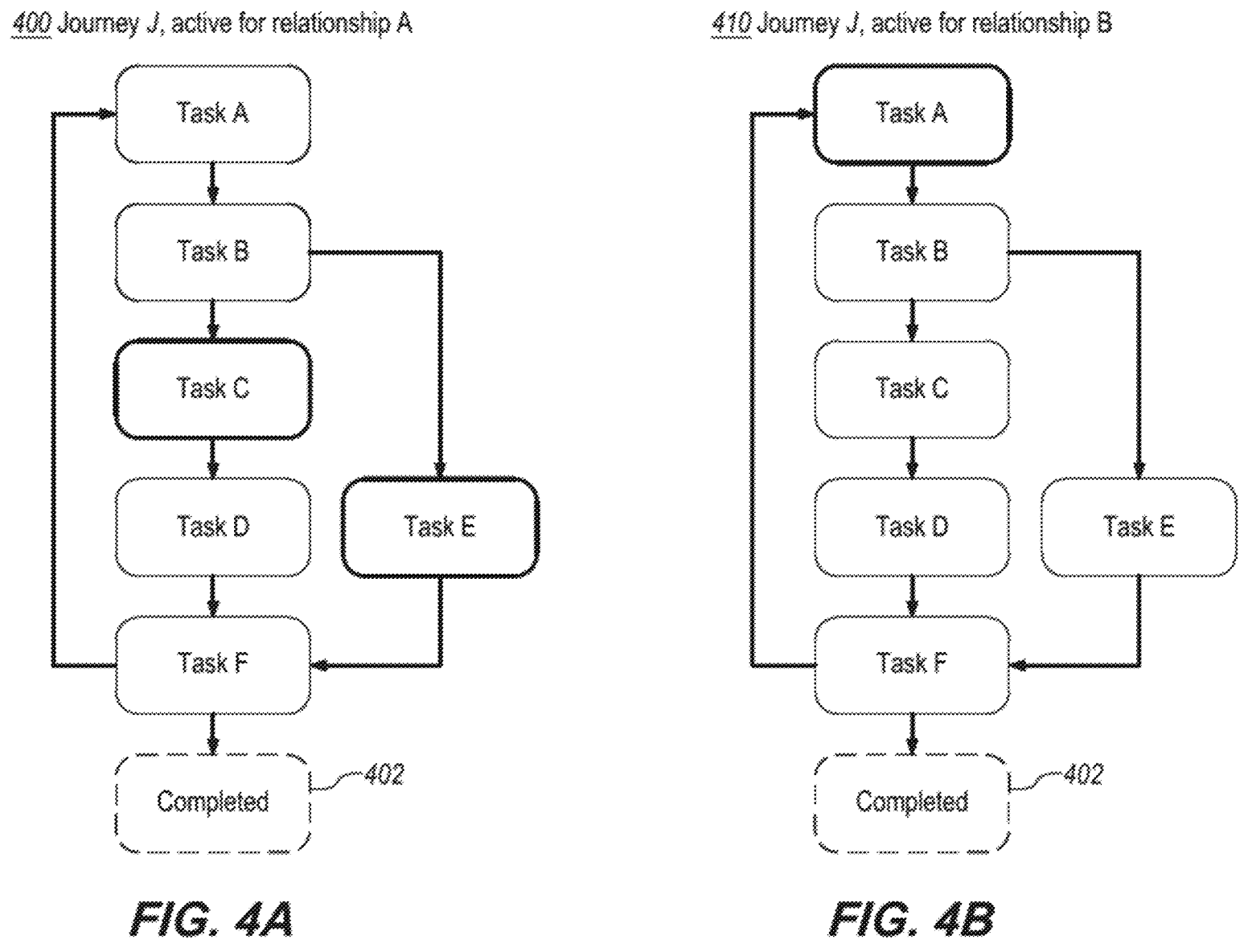

FIG. 4A demonstrates an example embodiment of a journey flow 400 that is active for relationship A. It is understood that once a journey is created, it may be assigned more than one relationship, and the progress of each journey within that relationship may be tracked individually. In one embodiment, Task A and Task B may be marked as completed, thereby moving to the next task. Tasks identified as next-upcoming tasks are distinguished by a thicker margin, as demonstrated by Task C and Task E. When a task's triggering conditions are met, the task may either be surfaced to its owner or executed automatically according to that task's specifications until the journey is marked as completed 402.

FIG. 4B demonstrates an example embodiment of a journey flow 410 that is active for relationship B. It is understood that once a journey is created, it may be assigned more than one relationship, and the progress of each journey within that relationship may be tracked individually. In one embodiment, Task A is indicated as the next-upcoming task, as distinguished by a thicker margin. It is understood that when a task's triggering conditions are met, the task may either be surfaced to its owner or executed automatically according to that task's specifications until the journey is marked as completed 402. Whenever a task's triggering conditions are met, the task will either be surfaced to its owner or executed automatically according to that task's specifications. Tasks that are surfaced to their owner can be modified by the owner prior to manually-triggered execution or simply skipped. When a task is executed, it will perform the following actions in rough order:

1. Retrieve the appropriate message template from the CMS.

2. Populate the message contents, which implies:

2.1 Replacing the categorical message recipients with their actual values as found in the W/CRM.

2.2 Identifying any template variables within the message text and replacing them with the current values from the appropriate store (either SOR, W/CRM, or a store internal to the MCCC).

2.3 Identify if there is an information exception embedding in the message and render the embedding if it exists.

3. Send the rendered message such that the message appears to be sent by the task owner.

When an information exception embedding is created, it is associated with a task in the form of a placeholder variable within the template message of that task. The placeholder variable will remain on the template until rendering (defined below), at which point it will be dynamically replaced with a description of the information exceptions that are present at the time of rendering in the SOR and/or document processor. Each embedding can in turn be scoped to show the exceptions corresponding to the entire requesting party or a specific member of the requesting party.

There are fundamentally two kinds of embeddings: point-in-time exception embeddings and real-time embeddings. A point-in-time embedding works as follows:

1. When a message is marked to be sent (during task execution), but before it is actually sent, poll the internal states of the SOR and document processor to retrieve the information exceptions for the requesting party the message will get sent to. Exceptions may include: documents that are currently needed from the requesting party (or a specific member of the decisioning party) and have not been submitted, documents that have been received but are awaiting some form of expert judgment or validation, documents that were received, but had some form of error requiring submission of different or additional information.

2. Replace the placeholder variable in the message with plain text, images and/or markup language text encoding a user interface detailing the exceptions (that is, the "rendered" exceptions) in a format that is appropriate for the channel in which the embedding is being rendered. On email, a variable may be replaced with a tabular representation of current exceptions, where columns detail document properties (for example name, status, URL to source) and there is one document per row. In one embodiment, on SMS, a summary of documents in each exception category may indicate, for example, "5 documents needed, 3 awaiting validation, 2 with errors".

3. Send the message with the rendered embedding.

In the case of real-time embeddings, the above sequence is identical, except instead of replacing the placeholder variable with rendered exceptions, the placeholder variable is replaced with source code that will itself fetch the exception data from the document processor and SOR and dynamically render the user interface for the exceptions on an on-demand basis. Two implementation examples include:

1. On a web application, insert JavaScript code into the message that will dynamically generate the HTML for the document exceptions.

2. In email, insert HTML tags to render an HTML email that will show the exceptions within an interactive format.

The information exception embeddings are a novel structure and are core to the various novel capabilities and methods described further in this document.

Note that, while the preferred embodiment describes a specific logical separation of components, this precise separation is not required to be logically enforced and can be virtually enforced instead. For example, a single web application may contain the functionality of both the W/CRM and the SOR (such would be the case if an embodiment leveraged the NCINO platform), or one could decide to implement the W/CRM, SOR, MCCC and document processor all within a single web application with a single shared data store. An embodiment simply requires the functionality described in the components listing and is agnostic to the precise scheme of logical separation.

FIG. 5 displays an example embodiment of the architecture of a distributed computer system 500. Boxes in FIG. 5 indicate functional components that can be sets of stored program instructions. Arrows in FIG. 5 indicate network links and/or paths of communication of digital messages. The following path labels indicate the following data flows: i.—Messages between parties and their metadata, including sender or receiver information; ii.—Processed documents and their metadata; iii.—Unprocessed documents and their metadata; iv.—Lists of relationships, contact information, workflows and activities tracked by the W/CRM; v.—Document judgments, commentary, and other annotations; vi.—Activity/event logs other than messages of (i.); vii.—Message templates and their metadata.

According to one embodiment, the techniques described are implemented by internet-enabled devices of the requesting parties. The internet-enabled devices of requesting parties may include, but are not limited to, a workstation 502, portable computer system 504, or handheld device 506. One or more internet-enabled devices of a requesting party may communicate with one or more communications channels such as requestor web user interface ("UI") 508, requesting party's email server(s) 510, and/or other channel communication platforms 512, such as SMS. Via path 514, the communications channels may transmit the following to the multi-channel communications controller ("MCCC") 518: i) messages between parties and their metadata, including sender/receiver information, ii) processed documents and their metadata, and iii) unprocessed documents and their metadata. It is understood that native components may include the document processor ("DP") 516, multi-channel communications controller ("MCCC"), and/or decisioner web user interface ("UI") 520. Via path 522, the decisioner web UI 520 may transmit document judgments, commentary, and other annotations to the DP 516. At path 524, the DP may transmit unprocessed documents and their metadata to the decisioner web UI 520.

Native components, such as the DP 516, MCCC 518, and decisioner web UI 520 may integrate with a plurality of back-end components. In some embodiments, back-end components may include a system of record ("SOR") 540, workflow/customer relationship management ("W/CRM") 542, and/or content management system ("CMS") 544. Using path 526, the DP 516 may transmit processed documents to the system of record ("SOR") 540. The SOR 540 may store, index, and serve document-based data about a requesting party. In some embodiments, the SOR may store and serve additional metadata about the documents it has on file. For example, historical versions of the document, logs of people who have viewed or approved the document, and named entities present in the document. Using path 528, the SOR may transmit processed documents and their metadata and/or unprocessed documents and their metadata to the DP 516.

Using path 530, the MCCC 518 may transmit unprocessed documents and their metadata to the DP 516. Using path 532, the W/CRM 542 may transmit lists of relationships, contact information, workflows, and activities tracked by the W/CRM 542 to the DP 516. In some embodiments, the MCCC 518 and W/CRM 542 may transmit information bi-directionally. Using path 534, MCCC 518 and W/CRM 542 may relay i) messages between parties and their metadata, including sender/receiver information, iv) lists of relationships, contact information, workflows, and activities tracked by the W/CRM, and vi) activity/event logs other than messages mentioned in (i). The CMS 544 and the MCCC 518 may also transmit information bi-directionally. Using path 536, the CMS 544 and MCCC 518 may relay vii) message templates and their metadata. In some embodiments, the CMS 544 may be a type of content management system where the content consists of templated communications (for example, email messages) and documents (for example, term sheets) that are typically interchanged between agents of the financial institution and those of the borrowing party. At a minimum, the CMS 544 may perform storing and serving of template documents or template text for use in other channels, including metadata about modifiable fields and segments of the template. Provided demographic, firmographic, or other information taken from the W/CRM 542, SOR 540, or other sources may return populated templates or rendered documents. The decisioner web UI 520 may communicate with one or more internet-enable devices of the decisioning party. The internet-enabled devices of decisioning parties may include, but are not limited to, a workstation 550, portable computer system 552, or handheld device 554.

Figure 6:
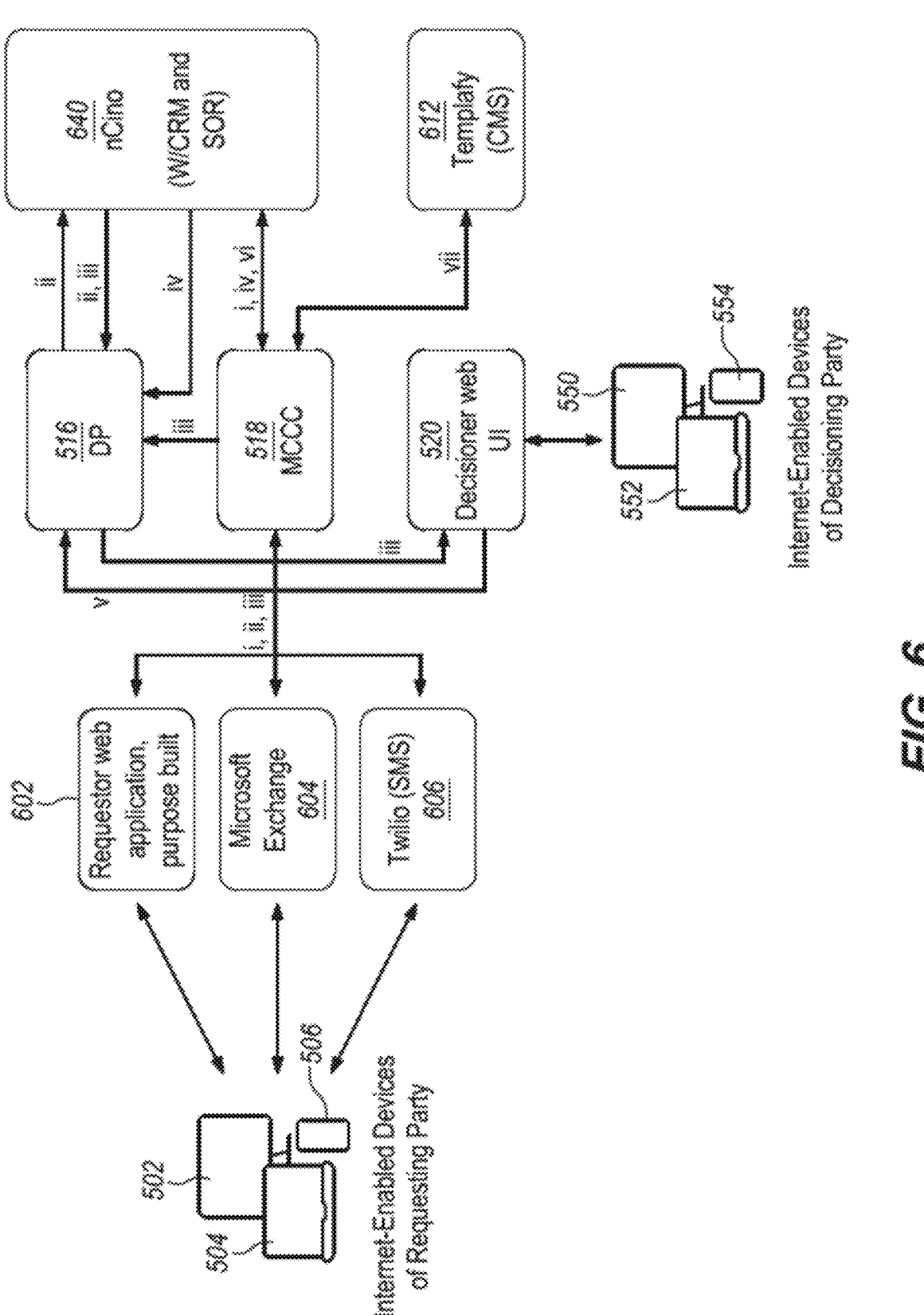
FIG. 6 illustrates a more specific representation of a computer system to implement one embodiment.

The example of FIG. 5 is a suitable solution for a commercial bank dealing in the issuing and administration of credit and other financial facilities to business customers. Thus, the decisioning party consists of bank employees and third parties representing the bank, whereas the requesting party consists of borrowers, guarantors, and third parties representing the borrowing entities or individuals. FIG. 6 presents a schematic of the sample embodiment, whereas FIG. 7 expands on the sample implementation of the native (that is, non-third-party) components.

2.7 Sample Architecture

FIG. 6 displays a representation of a computer system to implement one embodiment. The techniques described herein are implemented by at least one internet-enabled devices of requesting parties. The internet-enabled devices of requesting parties may include, but are not limited to, a workstation 502, portable computer system 504, or handheld device 506. One or more internet-enabled devices of the requesting party may communicate with at least one or more communications channels that may include but are not limited to the requestor web application 602, Microsoft Exchange 604, and/or Twilio (SMS) 606. Microsoft Exchange 604 may transmit the following to the multi-channel communications controller ("MCCC") 518: i) messages between parties and their metadata, including sender/receiver information, ii) processed documents and their metadata, and iii) unprocessed documents and their metadata. It is understood that native components may include the document processor ("DP") 516, multi-channel communications controller ("MCCC"), and/or decisioner web user interface ("UI") 520. In some embodiments, the decisioner web UI 520 may transmit document judgments, commentary, and other annotations to the DP 516. The DP 516 may transmit unprocessed documents and their metadata to the decisioner web UI 520. The MCCC 518 may transmit iii) unprocessed documents and their metadata to the DP 516.

Native components, such as the DP 516, MCCC 518, and decisioner web UI 520 may integrate with a plurality of back-end components, such as NCINO 640 (W/CRM and SOR) and TEMPLAFY (CMS) 612. In some embodiments, the DP 516 transmits ii) processed documents and their metadata to NCINO 640. NCINO 640 may transmit ii) processed documents and their metadata and iii) unprocessed documents and their metadata to the DP 516. NCINO 640 may transmit iv) lists of relationships, contact information, workflows and activities tracked by the W/CRM. It is understood that the MCCC 518 and NCINO 640 may bidirectionally transmit the following: i) messages between parties and their metadata, including sender/receiver information, iv) lists of relationships, contact information, workflows and activities tracked by the W/CRM, and vi) activity/event logs other than messages mentioned in (i). Additionally, the MCCC 518 and TEMPLAFY (CMS) 612 may bidirectionally transmit viii) message templates and their metadata. The decisioner web UI 520 may communicate with one or more internet-enable devices of the decisioning party. The internet-enabled devices of decisioning parties may include, but are not limited to, a workstation 550, portable computer system 552, or handheld device 554.

The sample embodiment as demonstrated in FIG. 6 uses the NCINO 640 platform to fulfill the W/CRM and SOR roles. Among other features, the NCINO 640 platform is capable of serving, storing and requesting information as described in the generalized representations of the W/CRM and SOR. The interface between the MCCC 518 and NCINO 640 is implemented via HTTP/S APIs, both the Lightning JSON APIs as described in the IGSZIM platform (on which NCINO relies on for managing the W/CRM data models) as well as NCINO native APIs (on which NCINO relies on for the SOR data models). The interface between the DP and NCINO is implemented through NCINO native HTTP/S APIs for access to their document management/SOR data models. In one embodiment, the TEMPLAFY platform may be used to fulfill the CMS 612 role. The interface between the MCCC 518 and the CMS 612 is implemented through TEMPLAFY's Open APIs.

The sample embodiment as demonstrated in FIG. 6 uses the Twilio platform as an integrated SMS 606 channel. The interface between the MCCC 518 and Twilio is managed through Twilio's HTTP/S APIs which allow for sending and receiving of messages directly from phone numbers associated with individual members of the decisioning parties.

Further, the sample embodiment as described uses a purpose-built, web application hosted in single-tenant public cloud infrastructure, (for example Heroku Runtime) accessible by public internet clients through a web (HTTP/S) browser. The front-end of the web application presents a user interface accessible to the borrower from which they can send and receive messages, decisioning data such as documents, and other metadata associated with these documents such as supporting commentary. The back-end of the web application interfaces with the MCCC 518 through HTTP/s RESTful APIs on a secured internal network. The sample UI application is a progressive web application, allowing it to be accessed through both desktop and mobile clients and also packaged and distributed in the form of mobile or desktop applications. In addition, it manages its own data store (in the form of a MongoDB high availability cluster) for the purpose of managing application authentication and access control, as well as storing and presenting other data beyond the scope of the system. Through the requestor UI, members of the requesting party can submit, view, and alter all of the data required by the decisioners during the decisioning loop, including the information exception embeddings as well as messages with other members of the requesting and decisioning parties. It is worth noting that the requestor UI may also be part of a larger web application with complete online banking services that are orthogonal to the scope of this disclosure, such as account ledgers.

The sample embodiment implements the DP 516 in the form of a multi-tenant web application hosted in public cloud infrastructure and accessible through RESTful HTTP/S APIs by the MCCC 518 and the Decisioner's UI 520 (in addition to the interfaces already mentioned). The complete application, as further described in FIG. 7 consists of two concurrent processes: a web service that implements the majority of the DP's functionality (that is, the "main service") and a polling service (that is, the "polling service") that repeatedly polls NCINO 640 on a fixed-interval basis. The Document Processor further uses MongoDB as a data layer to store and retrieve inferences, judgments, statistical learning models, documents, and other metadata on documents such as commentary from decisioning and requesting agents. The main service tracks the various inference steps mentioned in the generalized system architecture through the use of a finite state machine (FSM), such that each state transition represents any of: the addition of an inference from a statistical learning model; the identification that an expert judgment is needed instead of an automated inference; the addition of an expert judgment; injection of the document and its metadata into the SOR.

When a new document is submitted to the main service via API request, the service's logic pushes the document through various states of the FSM by invoking distinct statistical learning models (for example one for optical character recognition, one for named entity extraction, and one for missing signature detection), expert judgments, or storage routines until a final, "validated" state 106 is reached. The supervised statistical learning models are themselves hosted in individual web applications on public cloud infrastructure and invoked through HTTPs APIs, such that each invocation accepts the document and/or derivative data and returns an inference on the document.

Expert judgments are invoked through a notification that is routed to members of the decisioning party and appears on the Decisioner's Web UI 520. The corresponding expert judgments are added by the decisioning party directly through the UI, which returns them to the DP 516 via an HTTP/S API call. Finally, transitions in the FSM involving storage are managed by a synchronous sub-process that stores the fully or partially processed document and its associated metadata in the SOR. All expert judgments, along with inferences made by the supervised learning models, are stored in a data repository such as MongoDB upon collection by the DP 516. Judgments and inferences alike can later be retrieved in an asynchronous process for the purpose of developing and training new statistical learning models that better target the categorization, validation, and transformation requirements of the decisioning institution. External access to the data models and metadata maintained by the DP in MongoDB (which are needed, for example, by the Decisioner UI 520) is abstracted through different endpoints exposed by the main service's web API. Finally, the polling service periodically polls NCINO 640 for changes in the SOR data models (for example, to detect if a document was uploaded out-of-band directly into NCINO 640 and needs further processing), posting these to the main service via its exposed API on an as-needed basis.

Figure 7:
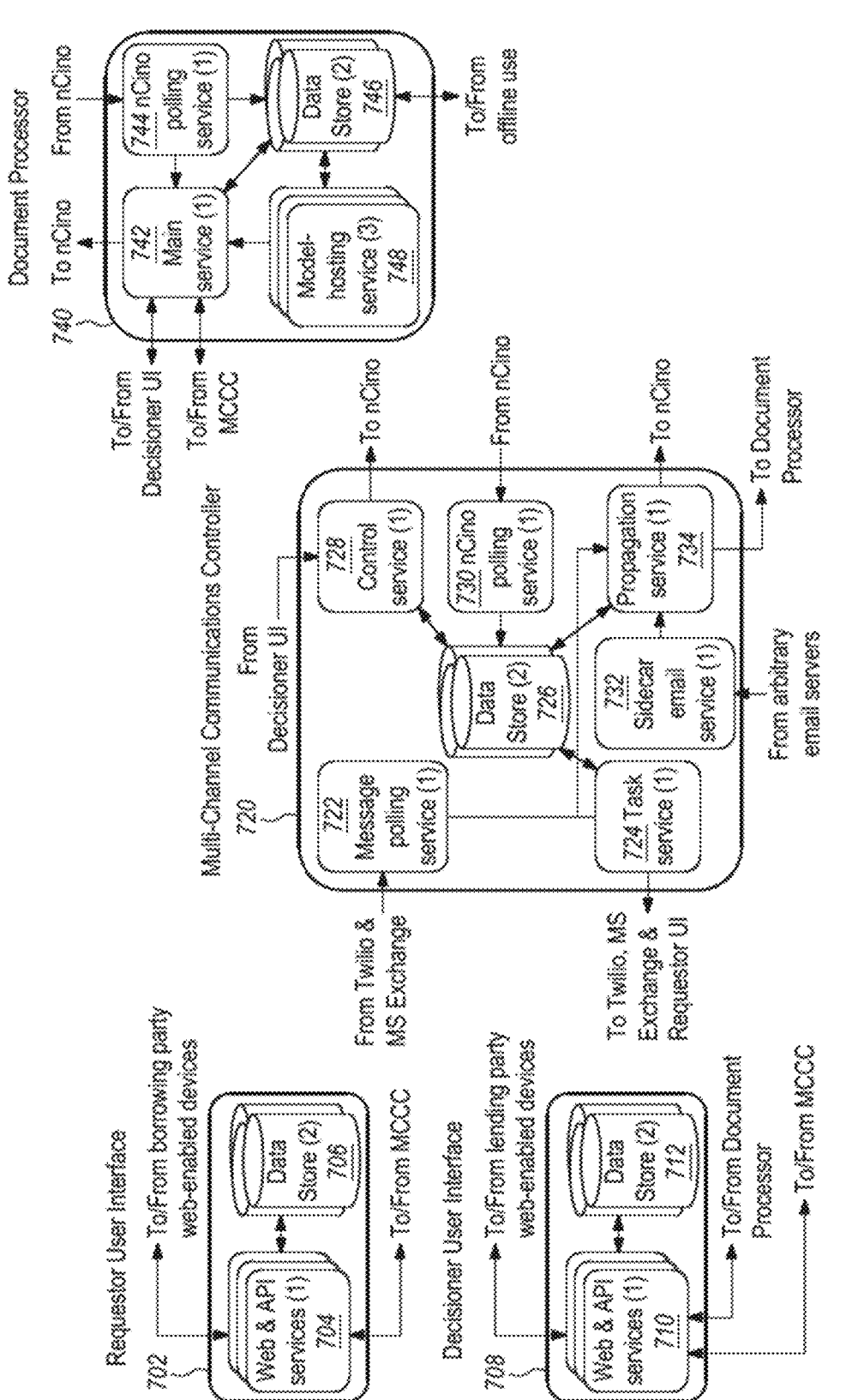
FIG. 7 illustrates detail of native components of an example embodiment.

FIG. 7 illustrates detail of native components of an example embodiment in which the Requestor User Interface System 702, Decisioner User Interface System 708, Multi-Channel Communications Controller System 720, and Document Processor System 740 may operate.

In one embodiment, the Requestor User Interface 702 uses a purpose-built, web application hosted in single-tenant public cloud infrastructure (for example Heroku Runtime) accessible by public internet clients through a web browser. The web and API services 704 may be communicatively coupled to one or more data stores 706. The front-end of the web and API services 704 presents a user interface accessible to the borrower or requesting party in which they may send and receive messages, decisioning data such as documents and other metadata associated with the documents, such as supporting commentary. The back-end of the web and API services 704 interfaces with the MCCC 518 through HTTP/s RESTful APIs on a secured internal network. In some embodiments, the requestor user interface may be accessed through both desktop and mobile clients and also packaged and distribution in the form of mobile or desktop applications. Further, the web and API services 704 manages its own data stores 706 for the purpose of managing application authentication and access control, as well as storing and presenting other data beyond the scope of the system.

Like the Requestor User Interface System 702, the Decisioner User Interface System 708 uses a purpose-built, web application hosted in single-tenant public cloud infrastructure (for example Heroku Runtime) accessible by public internet clients through a web (HTTP/S) browser. The front-end of the web application presents a user interface accessible to the lending party from which they may send and receive messages (along with their attachments and embeddings), view, modify and validate data submitted to the requesting party, and perform other actions such as document preparation and annotation. The back-end of the web and API services 710 interfaces with the MCCC 518 and DP 516 through their respective HTTP/s RESTful APIs on a secured internal network. In some embodiments, decisioner user interface is a progressive web application, allowing it to be accessed through both desktop and mobile clients and also packaged and distributed in the form of mobile or desktop applications. In addition, the web and API services 710 manages its own data store 712 for the purpose of managing application authentication and access control.

The Multi-Channel Communications Controller System 720 may comprise the following six separate web services: message polling service 722, task service 724, one or more data stores 726, control service 728, NCINO polling service 730, sidecar email service 732, and propagation service 734. The Multi-Channel Communications Controller System 720 implements the MCCC 518 in the form of a multi-tenant web application hosted in public cloud infrastructure and accessible through RESTful HTTP/S APIs by the decisioner's UI 520. The application itself consists of six separate web services, mentioned above, all of which connect to a shared MongoDB instance used as a central data store 726.

In some embodiments, the message polling service 722 continuously polls channels without push capabilities for inbound messages. In the case of SMS, the message polling service 722 polls the Twilio API to track replies to ongoing conversations. In the case of email, the message polling service 722 polls the Microsoft Exchange Graph API to detect new inbound messages as well as replies to ongoing conversations within the email inboxes of the various users in the decisioning party. Whenever a reply is detected, it is passed onto the propagation service 734 via its APIs.

The propagation service 734 exposes a set of RESTful APIs, which allow for messages to be pushed into data store 518 of the MCCC. Messages are structured by the propagation service 734 into their individual constituents (raw text, attachments, sender and receiver information) and subsequently pushes them to the internal data store 726, to the document processor 516 (in the case of attachments which are suspected to contain documents) and NCINO 640 (in the case of the raw text and metadata which will be logged as an Activity) through their respective APIs.

The task service 724 continuously polls active journeys in MongoDB and checks for the execution conditions of their first-most uncompleted task(s), querying the various internal and external services and data stores 726 to verify if execution conditions have been met. If the execution conditions are met, the task service 724 will either automatically execute the task according to the aforementioned task description (and subsequently update the MCCC 518 state to reflect the task has been executed) or store the task in a staging collection. When tasks involve the sending of messages and their associated metadata, these are also passed to the propagation service 734. Finally, it is specified that the task service 724 can send all the outbound messages across the three channels by using each channel's corresponding APIs such that the messages will appear to their receiver as being sent directly by the decisioning agent specified in that journey's task.

The control service 728 exposes a set of RESTful APIs that allow other services or users to read or modify the internal state managed by the MCCC 518, as well as the state of the SOR or W/CRM such as NCINO. This includes operations to create, read, update or delete new journeys and journey templates, operations to modify the state of active journeys and their tasks (for example activating or pausing the journey, switching the currently-active task), operations to modify access control permissions, as well as select operations exposed by the APIs of the W/CRM or SOR. It also exposes API endpoints that allow tasks staged by the task service to be modified, canceled, or marked as needing immediate execution by the task service. The Requestor UI System 702 interfaces with the MCCC 518 primarily through the control service 728, and all modifications of the W/CRM or SOR states that take place through the Decisioner UI 520 will go through the control service 728.

The sidecar email service 732 hosts a stand-alone email server with a single email inbox to which arbitrary messages can be forwarded, along with a separate web service that continually polls this inbox. When a message is forwarded to this inbox, the service checks the original sender's information as well as the W/CRM to determine if the original sender is a recognized member of the requesting party. If it is, then the message is sent to the propagation service 734 as if it had arrived at an inbox monitored by the message polling service 722. Otherwise, it is stored in the data store 726 as part of a collection of "unknown" messages where they can subsequently be assigned to a requesting party or otherwise modified through the control service's APIs.

The Document Processor System 740 implements the DP 516 in the form of a multi-tenant web application hosted in public cloud infrastructure and accessible through RESTful HTTP/S APIs by the MCCC 518 and the Decisioner's UI 520 (in addition to the interfaces already mentioned). The complete application consists of two concurrent processes, a web service that implements the majority of the DP's functionality (that is, the "main service 742") and an NCINO polling service 744 (that is, the "polling service") that repeatedly polls NCINO on a fixed-interval basis. Main service 742 may be programmatically coupled to a plurality of model-hosting services 748 that implement respectively a plurality of different machine learning models that have been trained to classify electronic documents to implement optical character recognition, named entity extraction, missing signature detection, or other recognition. In an embodiment, model-hosting services are implemented using TENSORFLOW services, Python code and C++ scripts hosted in a third-party cloud computing environment such as Amazon Web Services EKS.

The Document Processor 516 further uses a datastore 746 such as MongoDB as a data layer to store and retrieve inferences, judgments, statistical learning models, documents, and other metadata on documents such as commentary from decisioning and requesting agents. The main service 742 tracks the various inference steps mentioned in the generalized system architecture through the use of a finite state machine (FSM).

When a new document is submitted to the main service 742 via API request, the service's logic pushes the document through various states of the FSM by invoking distinct statistical learning models (for example one for optical character recognition, one for named entity extraction, and one for missing signature detection), expert judgments, or storage routines until a final, "validated 106" state is reached. The supervised statistical learning models are themselves hosted in individual web applications on public cloud infrastructure and invoked through HTTPs APIs, such that each invocation accepts the document and/or derivative data and returns an inference on the document. As an example and not by way of limitation, expert judgments may automatically annotate documents that would otherwise be captured by one or more inference models. As another example and not by way of limitation, expert judgements may consist of manual annotations. For example, in the case that the system is extracting a document associated with a bank, judgements may be manual annotations identifying "this is an instance of {category}" (e.g., Business Tax Return), "this document belongs to {entity}" (e.g., Business LLC), "the document mentions {officers}" (e.g., John and Jane Doe), and/or "the year of this document is {year}" (e.g., 2022). Although this disclosure demonstrates the above examples of expert judgements, this disclosure contemplates any suitable category of expert judgements. It is understood that "expert judgements" and "judgements" may be used interchangeably in this document. In particular embodiments, the present system may capture judgements for documents that do not require intervention. In another embodiment, the system may prompt one or more users to manually provide a judgement. As another example and not by way of limitation, the user may manually enter judgement in the absence of a prompt to provide a judgement. Further, in the case that the model has made an inference, a user may override the inference with a judgement or input a judgement alongside the judgement provided by the system.

Expert judgments are invoked through a notification that is routed to members of the decisioning party and appears on the Decisioner's Web UI 520. The corresponding expert judgments are added by the decisioning party directly through the UI, which returns them to the DP 516 via an HTTP/S API call. Finally, transitions in the FSM involving storage are managed by a synchronous sub-process that stores the fully or partially processed document and its associated metadata in the SOR. All expert judgments, along with inferences made by the supervised learning models, are stored in MongoDB upon collection by the DP 516. Judgments and inferences alike can later be retrieved in an asynchronous process for the purpose of developing and training new statistical learning models that better target the categorization, validation, and transformation requirements of the decisioning institution. External access to the data models and metadata maintained by the DP 516 in MongoDB (which are needed, for example, by the Decisioner UI 520) is abstracted through different endpoints exposed by the main service's web API. Finally, the NCINO polling service 744 periodically polls NCINO for changes in the SOR data models (for example, to detect if a document was uploaded out-of-band directly into NCINO and needs further processing), posting these to the main service 742 via its exposed API on an as-needed basis.

In an embodiment, the following functional elements may be implemented using NodeJS and REACT servers hosted in a third-party cloud computing environment such as Amazon Web Services EKS: 704, 710, 722, 724, 728, 730, 732, 734, 742, 744.

2.8 Sample Novel Capabilities and Methods

Thanks to its automated state transitions, its ability to present a unified, updated view of the global state of information and its ability to configure and dynamically modify journeys, the system of this disclosure enables a large number of novel use cases and capabilities which were not possible with prior approaches.

Consider the scenario of a bank requesting documents required to originate a commercial loan. This will typically imply collecting dozens of documents belonging to a business (for example company financials, articles of organization/incorporation and bylaws, proofs of insurance etc.) as well as documents for each of the individual guarantors and select officers of the company (for example personal financial statements, mortgages or deeds used as collateral, tax returns etc.). It is important to note that although all of these documents will be used for a single loan to the business, the documents typically must originate from different members of the collective borrowing party. For example, the company's CEO may provide the articles of incorporation and organization, an external CPA may provide the financials, and each of the owners will individually submit their personal financial statements.

Assume the lending institution uses an embodiment like that described in FIG. 6. When a lending agent configures a journey for commercial loans, the lending agent may use their computer and account to add individual tasks that will request documents from each member of the borrowing party via an email message directly from the lender's email inbox. The lender may use their computer and account to configure the tasks so that there is an individual message, each with an individual information exception embedding, sent to each of the members of the requesting party. For example:

One task (including email message and information exception embedding) sent to the primary point of contact requesting all information corresponding to the underwritten company.

One task (including email message and information exception embedding) sent to the CPA contact requesting all historical financials and tax returns.

N tasks, one for each individual guarantor of the loan (including email message and information exception embedding) requesting personal financial statements and tax returns.

The lender may also use their computer and account to include tasks representing both email and SMS automated reminders that conditionally get sent to their recipients if there appears to be insufficient or stagnant activity from that relationship in a few days (for example, no replies to the original message or also no documents added to the SOR within the past 7 days). Once a lender adds a relationship and contact information on either their W/CRM (NCINO 640 in the example) or directly via the Decisioner UI 520, the lender can use their computer and account to assign this journey to the requesting relationship/party and activate the journey for said party. Once activated, the MCCC 518 will execute the tasks and send personalized emails to each of the requesting party members asking for information.

Each member of the requesting party can then use their computer and account to reply to the lender with their documents directly via email, which will be processed automatically by the DP 516. Requestors can also log in to the Requestor UI 520 from the embodiment and directly upload the documents there. Given the proposed architecture, one can verify that even if a requestor submits a document via email, the online portal will immediately reflect the fact that said documents have already been received by the bank, eliminating the need to manually distinguish requested-yet-not-sent documents from those which were sent through a separate channel.

If a reminding tasks' conditions are met, members of the requesting party may use their computer and account to receive additional automated emails from the lender, obviating the need for the lender to track which relationships may need reminders. However, these reminder emails will correctly and automatically reflect the state of each of the individual documents in the original request, detailing which documents have already been received and/or validated and which ones are awaiting next steps.

2.8.1 Automated, Personalized and Consistent Recurring Information Request

Lenders typically need to monitor the financial health of companies, individuals, and collateral they underwrite for a loan on a recurring basis. For this use case, the lender can configure a separate journey that will request the right information from each of the individuals in the borrowing party on a recurring basis (for example, quarterly, monthly, or yearly). Like with the origination example, these requests can consist of personalized messages with attached embeddings that correctly reflect the state of documents as received by the bank, allowing the lender to specify which documents are needed and which ones have already been received without needing to build this list of documents themselves.

2.8.2 Inline Multi-Party Document Commentary on a Document Request

Documents submitted by the requesting party will typically need validation in part of the decisioning party (for example verifying signatures, execution date, and entity names match expectations) and may result in additional questions by the decisioning agent or specific instructions on how the document should change so as to be validated. Furthermore, it is often the case that the decisioning agent that performs these validations is not the same one that maintains interaction with the borrowing party. For example, a bank underwriter may have some questions regarding a specific line item within a profit & loss statement but may not be able to route these questions without first going through the bank's relationship manager ("RM").

Using the running underwriter and RM example, the way this would be addressed is that the underwriter with a question or proposed corrections would use their computer and account to share them (in person or via email) with the RM, who maintains contact with the requesting party. The relationship manager would in turn use their computer and account to share these concerns with the borrowing party, who will have to correlate them back to the specific documents and sections within those documents that the underwriter was referring to. This back-and-forth creates a broken experience for the borrowing party as it may not be obvious what the problem with the documents is unless given very specific feedback or instructions, which is hard to provide in a non-verbose way unless done in a call or in-person meeting whilst having the documents on-hand.

An embodiment of the system of this disclosure solves the above problem as follows: when a document is being reviewed by the document processor ("DP") 516, whether automatically through the statistical learning models or manually through the request of expert judgment, the system collects commentary on failed validations or questions, which are then stored as metadata on the document. Decisioning agents may use their computer and account to highlight the specific area of the document that corresponds to each question or invalidation directly through the Decisioner UI 520, which can present them the raw document along with inferences from the statistical learning models stored by the DP 516. Once a question or invalid condition is stored as an information exception, all members of the decisioning and requesting parties can use their computer and account to immediately view the exception and its supporting commentary alongside the original documents through any of the available channels. Furthermore, automated, or partially automated notifications to the requesting party can be sent so long as this was configured as a task within the relationship's active journey. Using the running loan origination example, the following sections detail a specific instance of how this may occur.

In one embodiment, during document validation, the DP 516 detects a mismatch between the legal entity in a tax return and the entities previously seen (for example Acme, Inc. vs Acme LLC.), which triggers the need of expert intervention. The underwriter, identified as an expert of the decisioning party, then use their computer and account to receive a notification via the Decisioner UI 520 and is prompted to resolve the issue. The underwriter then decides that further clarification will be needed from the borrowing party. The underwriter uses their computer and account to write a comment along the specific area of the tax return where the information exception was located: "Is this a typo? Or do we still need separate returns for Acme LLC)?" Once stored, any member of the borrowing party or decisioning party can now use their computer and account to view this comment through any channel as part of an information exception embedding. Assuming notifications on exceptions were configured as tasks on the currently active journey for this relationship, the MCCC 518 may send an automated, personalized email with an information exception embedding directly from the relationship manager's inbox to the borrowing party indicating the "decisioning team has additional questions on one of the documents, which can be found below." The borrowing party receiving the email can then use their computer and account to read the notification from the RM, along with the underwriter's question and a link to the original document, directly on their email inbox. Replies to this email can be then stored by the MCCC 518 and associated with the document which had the exception, making them visible through the Decisioning UI 520 to all members of the decisioning party including the underwriter.

2.8.3 Single-Step Document Requests from Decisioning Back-Office to Requesting Party In another example, consider the case of an ongoing commercial loan application where an underwriter determines that additional documents, which were not contemplated at the time the journey was created, are needed in order to underwrite a collateral asset. Traditionally, this would imply the underwriter (who does not typically communicate with the borrowing partly) send a written message detailing the request to the relationship manager, who in turn will forward it to the appropriate member of the borrowing party. This adds unnecessary steps and delays to the decisioning loop which the technology can avoid in at least two ways.

In one method, the underwriter can simply use their computer and account to mark the additional documents as "needed 102" in the SOR (NCINO 640 using FIG. 6). This will automatically change the content within the information exception embeddings of future messages sent by the relationship manager to reflect this new need. In another, more involved example, the underwriter can use their computer and account to both mark the document(s) as "needed 102" and also send a new message from the relationship manager's inbox in one single step. This can be achieved by marking the new documents as needed within the Requestor UI 520 (which will, in turn, modify NCINO'S DOCMAN SOR to reflect this change using the MCCC's 518 control service) and optionally including a message to the borrower detailing the new request. In an embodiment, the system is programmed to dynamically modify the currently active journey by adding a new task for either immediate execution or staging. Said task will include an information exception embedding highlighting the change and will be marked as needed to be sent from the relationship manager's inbox. If the task is marked for immediate execution, the MCCC's 518 task manager will send it automatically. Otherwise, it will be surfaced to the relationship manager for final verification or modification prior to being sent.

Figure 8:
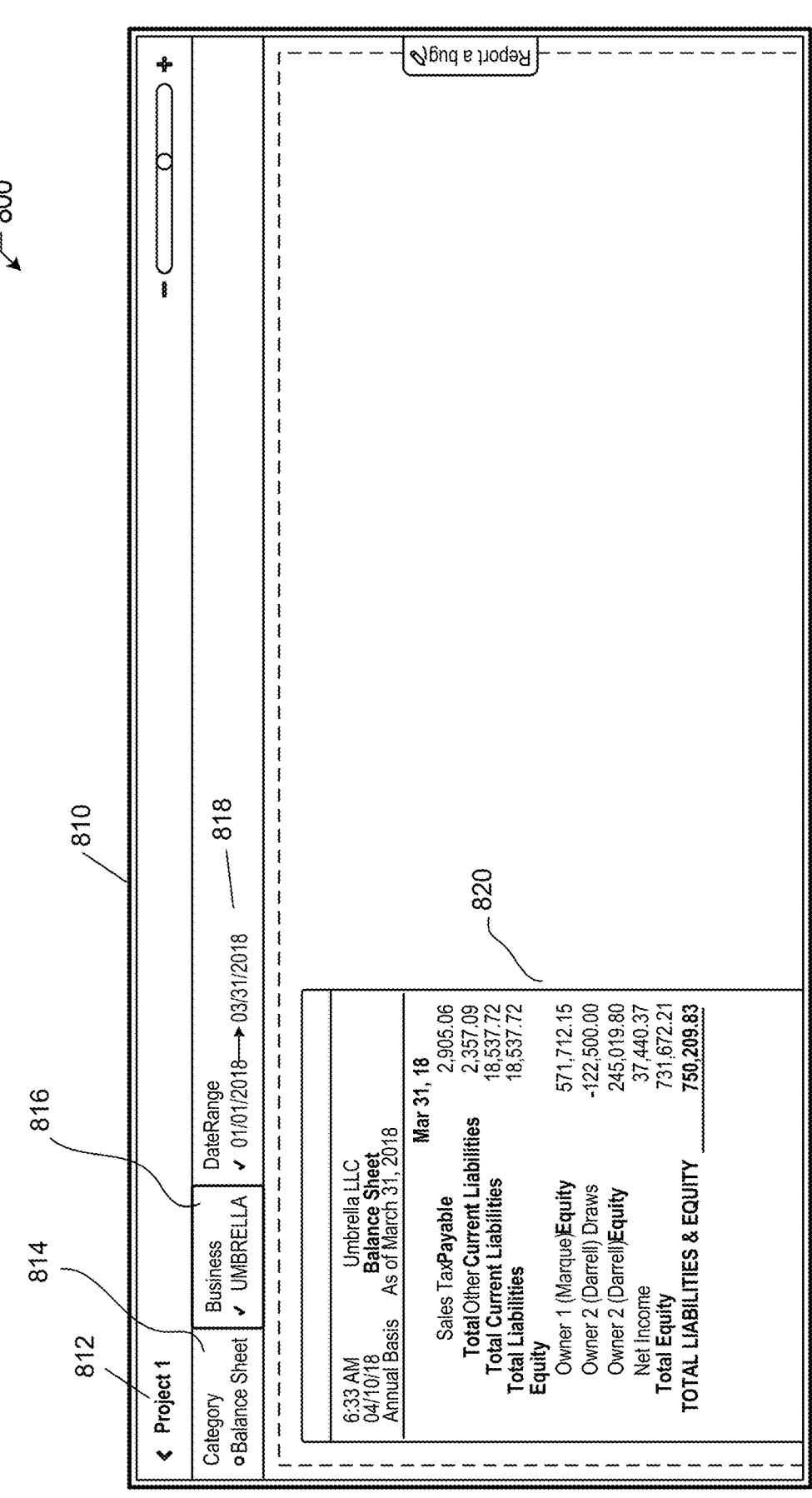
FIG. 8 illustrates a diagram of an example graphical user interface for providing judgements and/or annotations.

FIG. 8 illustrates a diagram 800 of an example graphical user interface for providing judgements and/or annotations.

FIG. 8, and each other drawing figure of this disclosure that shows a graphical user interface or screen displays, is intended to show a portion of a computer display device and to represent outputs, renderings, and/or the execution of presentation instructions that occur under stored program control, via a plurality of functional elements. It will be understood that a commercial or practical implementation of FIG. 8, and each other drawing figure of this disclosure that shows a graphical user interface or screen displays, involves creating, testing, and debugging programs, scripts, images, and commands that interoperate to output the content shown in the drawing figures or presentation instructions or browser side-script code that could be interpreted at the browser to render the content shown in the drawing figures, and the preparation of such programs, scripts, images, and commands is within the level of ordinary skill to which this disclosure is directed. A specific disclosure of programs, scripts, images, and commands is not needed as FIG. 8, and each other drawing figure of this disclosure that shows a graphical user interface or screen displays communicate the configuration and content that should result from the programming.

In particular embodiments, one or more processors of the internet-enabled devices of the requesting party (e.g., workstation 502, portable computer system 504, and/or handheld device 506) and/or the internet-enabled devices of the decisioning party (e.g., workstation 550, portable computer system 552, and/or handheld device 554) may provide instructions to browser 810 to render the platform as part of a GUI to appear on the Decisioner's Web UI 520 and/or the Requestor's web UI 508. In each case, the Requestor's web UI 508 and Decisioner's web UI 520 may use a purpose-built, web application hosted in single-tenant public cloud infrastructure (for example Heroku Runtime) accessible by public internet clients through a web (HTTP/S) browser 810. The front-end of the web application presents a user interface accessible to the lending party (e.g., decisioning party) from which they may send and receive messages (along with their attachments and embeddings), view, modify and validate data submitted to the requesting party, and perform other actions such as document preparation and annotation. The back-end of the web and API services 710 interfaces with the MCCC 518 and DP 516 through their respective HTTP/s RESTful APIs on a secured internal network. In some embodiments, the Decisioner's web UI 520 may be a progressive web application, allowing it to be accessed through both desktop and mobile clients and also packaged and distributed in the form of mobile or desktop applications. In addition, the web and API services 710 manages its own data store 712 for the purpose of managing application authentication and access control.

In particular embodiments, browser 810 may render the platform on the internet-enabled devices of the decisioning party, wherein the decisioning party may be presented with a metadata from documents provided by the requesting party. As an example and not by way of limitation, browser 810 may include a matter functionality 812 (e.g., "Project 1"), in which the decisioning party may view a compilation of datum from a particular requesting party marked with a state of received 104 and/or validated 106 by the decisioning party. For example, datum compiled from a particular requesting party may be stored by the platform and tagged by a matter title (e.g., Project 1), so the decisioning party may navigate between client matters within the platform UI (e.g., Decisioner's web UI 520).

In particular embodiments, a distributed computer system under stored program control may automatically validate data received by the decisioning party as soon as it reaches the decisioning party through any of the digital communications channels used by the party (for example email, SMS and/or a web portal), wherein the validated data may be displayed in section 820 of browser 810. The system achieves this through the use of various statistical learning models within a human-in-the-loop ecosystem that is connected to the decisioning party's various communication channels. Thus, the system is capable of showing a view of the global state of information for display to the decisioning party in section 820. In the case where a subset of received data require human intervention, the system may be programmed to present the data in section 820 of browser 810, where members of the decisioning party may properly categorize, validate, and/or annotate records. In particular embodiments, browser 810 may include an editable text field, wherein the decisioning party may manually input text, annotations, and/or judgements in the form of an editable text field, selectable box, or other functionality.

In particular embodiments, browser 810 may include a plurality of tabs 814, 816, and 818, in which the decisioning party may filter received datum. For example, tab 818 may present the decisioning party with a timeline functionality. As an example and not by way of limitation, when selected, the timeline functionality may display a calendar interface. In this example, the system may determine an input threshold (e.g., two dates must be selected) to enable functionality, wherein the decisioning party may be presented with one or more selectable options and/or editable text boxes for entering input. As another example and not by way of limitation, tab 814 may present the decisioning party with a functionality to select a "Category" of document from one or more options. As displayed in FIG. 8, tab 814 displays a category of "Balance Sheet," in which datum from the Balance Sheet is displayed by section 820. Further, as another example and not by way of limitation, tab 816 may display information about the requesting party, such as the name of the business/ entity of the requesting party. As displayed in diagram 800 of FIG. 8, tab 816 demonstrates the Business name "Umbrella," which matches the datum displayed in section 820. It is understood that tabs 814, 816, 818 may be editable and used to input judgement manually, overriding any previously made machine inferences. Although this disclosure discusses FIG. 8 as a graphical user interface presented to one or more internet-enabled devices of the decisioning party (e.g., workstation 550, portable computer system 552, and/or handheld device 554), this disclosure contemplates display of the graphical user interface at internet-enabled devices of the requesting party (e.g., workstation 502, portable computer system 504, and/or handheld device 506), or any other suitable device.

Figure 9:
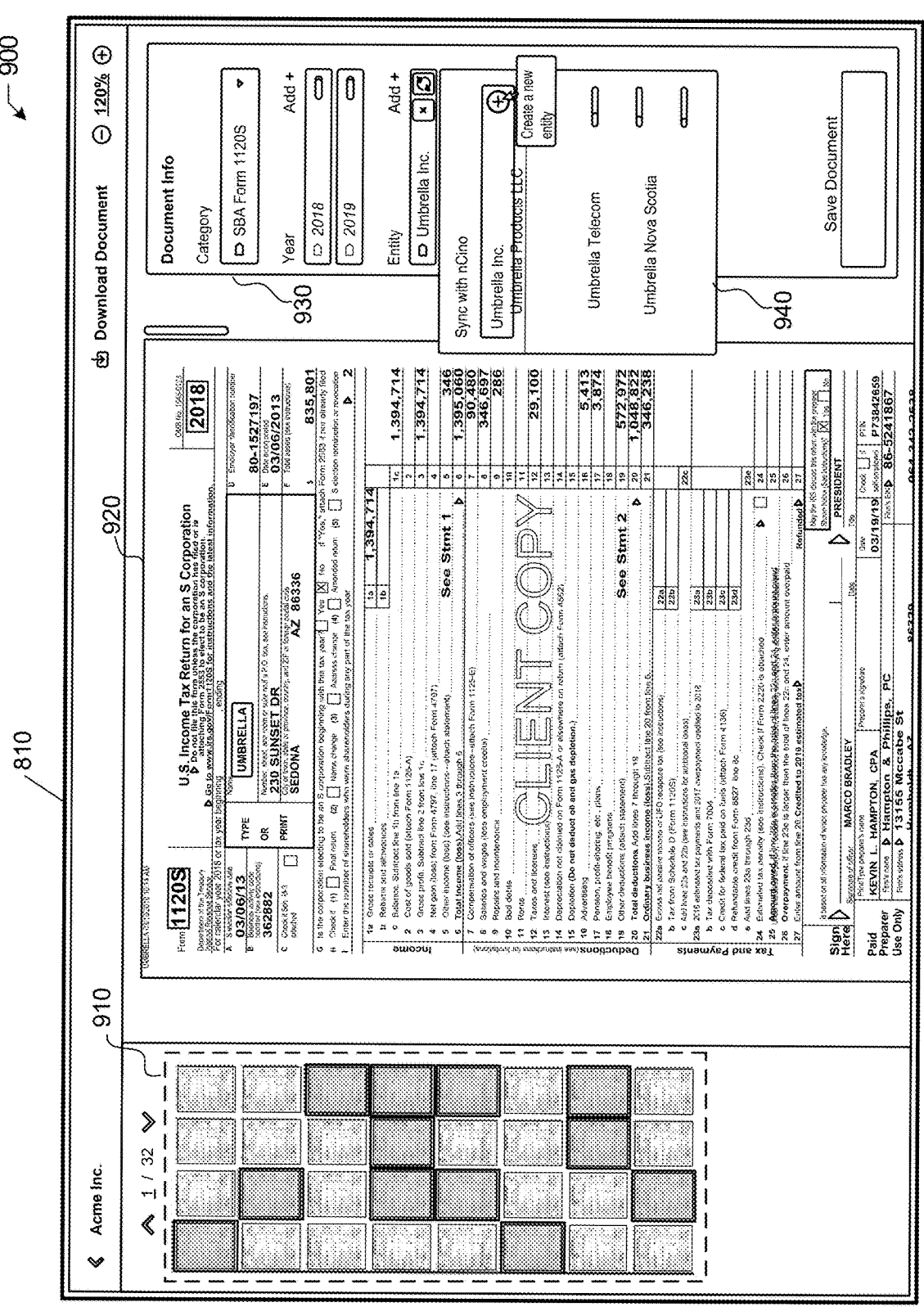
FIG. 9 illustrates a diagram of an example graphical user interface in which synchronization of documents may operate.

FIG. 9 illustrates a diagram 900 of an example graphical user interface in which synchronization of documents may operate. In particular embodiments one or more processors of the internet-enabled devices of the requesting party (e.g., workstation 502, portable computer system 504, and/or handheld device 506) and/or the internet-enabled devices of the decisioning party (e.g., workstation 550, portable computer system 552, and/or handheld device 554) may provide instructions to browser 810 to render the platform as part of a GUI to appear on the Decisioner's Web UI 520 and/or the Requestor's web UI 508. In particular embodiments, document display functionality 910 may present one or more pages of a particular document, allowing a user to select specific pages of a document for display.

In particular embodiments, document 920 may be displayed and the platform may automatically process each page of document 920 with sequences of stored program instructions and leverage a number of computer vision routines and statistical learning models to extract datum from document 920 (e.g., first page of a U.S. Income Tax Return). Further, the platform may synchronize the datum with the system of record based on the inferred entity and category attributes.

As an example and not by way of limitation, the platform may review document 920 and automatically infer the subjects and named entities (for example people, locations, businesses) mentioned in document 920, and, when applicable, associate the document with the matching entities present in the W/CRM and/or SOR (relationships, leads, prospects, accounts, etc.). In an embodiment, code to associate the subjects may be programmed to store, in a record of the electronic document in the system of record, references to one or more entities that are identified in the CRM system and that match the one or more subjects, after transmitting to the CRM system a query identifying the subjects and configured to return a result set of the matching entities in the CRM system.

In particular embodiments, panel 930 may display the categorized inferences in panel 930 for review. In the example of diagram 900, panel 930 may display the datum categorized into, for example: year, entity, and category of form. In particular embodiments, panel 940 may be presented to a user, allowing the user to override the entity determination previously made by the platform. In the example of diagram 900, the user may override the entity in panel 940 by selecting a new entity name (e.g., choosing from a selection of Umbrella Inc., Umbrella Products LLC, etc.), in which case the manual entity change may change the synchronization destination within the platform.

Figure 10:
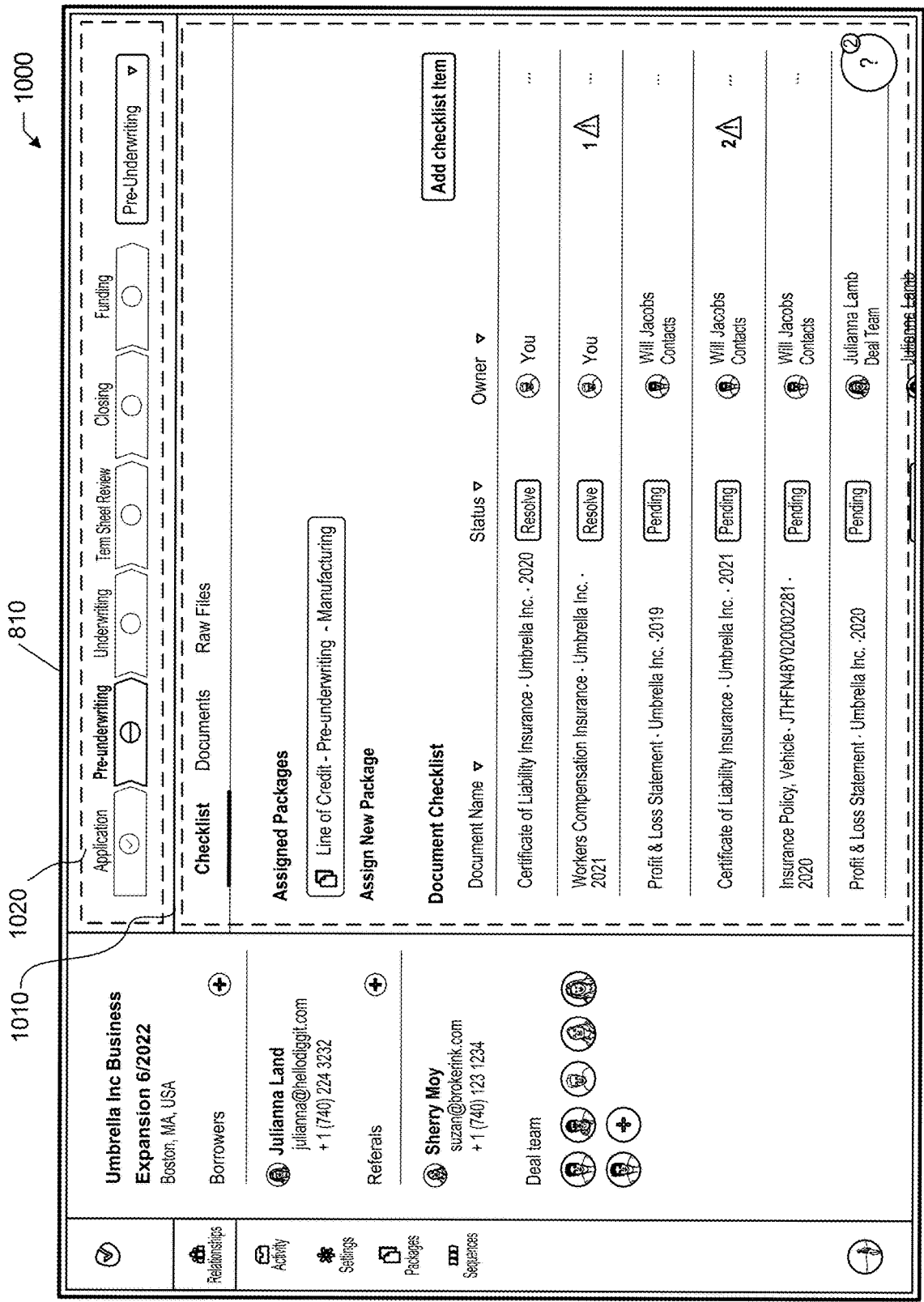
FIG. 10 illustrates a diagram of an example graphical user interface in which a checklist functionality may operate.

FIG. 10 illustrates a diagram 1000 of an example graphical user interface in which a checklist functionality may operate. In particular embodiments, one or more processors of the internet-enabled devices of the requesting party (e.g., workstation 502, portable computer system 504, and/or handheld device 506) and/or the internet-enabled devices of the decisioning party (e.g., workstation 550, portable computer system 552, and/or handheld device 554) may provide instructions to browser 810 to render the platform as part of a GUI to appear on the Decisioner's Web UI 520 and/or the Requestor's web UI 508. In the example of diagram 1000, browser 810 may display checklist interface 1010, in which a checklist tracking the state of various needed 102 documents may be displayed. In particular embodiments, status bar 1020 may display an indication of which state and/or stage in the process the requestor is currently in. For example, the status bar may indicate the requestor is in the "Application" phase, "Pre-underwriting" phase, "Underwriting" phase, "Term Sheet Review" phase, "Closing" phase, and/or "Funding" phase. Although this disclosure discusses the aforementioned phases, this disclosure contemplates any suitable phase.

The checklist of items displayed in checklist interface 1010 may correspond to the list of items that will be embedded into the automated information request, allowing the lender to specify which documents are outstanding/ needed 102 and which documents have been sent 112 and/or validated 106. The checklist interface 1010 may categorize the list of documents by document name, status, and/or owner. Although this disclosure contemplates the document checklist categories as forementioned, this disclosure contemplates any suitable drop-down categorization functionality.

Figure 11:
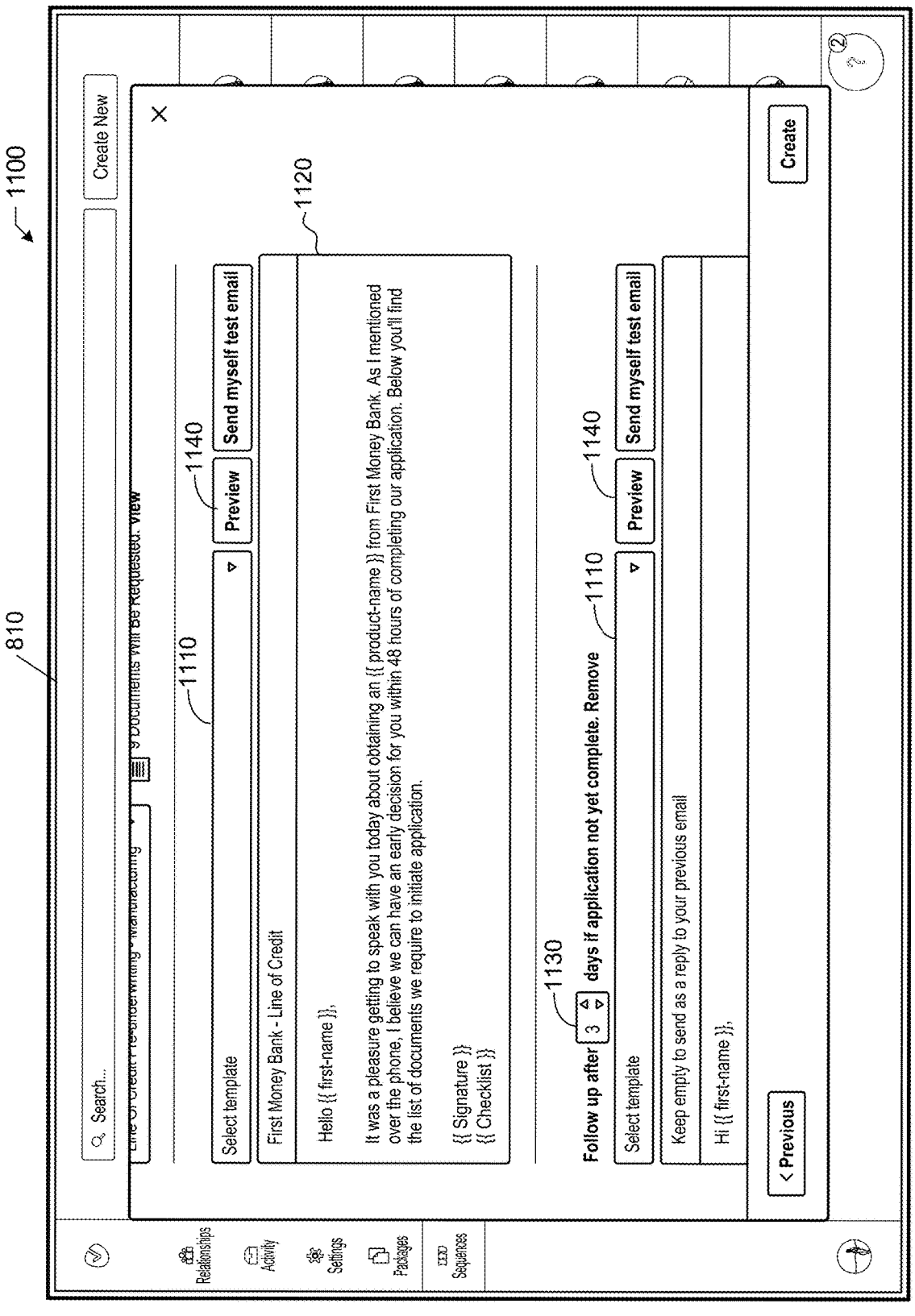
FIG. 11 illustrates a diagram of an example graphical user interface in which a sequence may be initiated and/or drafted.

FIG. 11 illustrates a diagram 1100 of an example graphical user interface in which a sequence may be initiated and/or drafted. In particular embodiments, one or more processors of the internet-enabled devices of the decisioning party (e.g., workstation 550, portable computer system 552, and/or handheld device 554) may provide instructions to browser 810 to render the platform as part of a GUI to appear on the Decisioner's Web UI 520. In particular embodiments, the decisioning party may be presented with a plurality of selectable options in drop-down menu 1110, wherein the decisioner may be presented with a plurality of template options. In response to the decisioner selecting a template from the plurality of selectable options in drop-down menu 1110, editable text box 1120 may be automatically generated. As an example and not by way of limitation, the message within editable text box 1120 may consist of personalized messages with attached embeddings in communication with the SOR that correctly reflect the state of documents as received. This functionality allows the decisioning party to specify which documents are needed 102 and which ones have already been received when transmitting the information request to the requesting party via the multi-channel communication system. One or more internet-enabled devices of a requesting party may communicate with one or more communications channels such as requestor web user interface ("UI") 508, requesting party's email server(s) 510, and/or other channel communication platforms 512, such as SMS. Via path 514, the communications channels may transmit the following to the multi-channel communications controller ("MCCC") 518: i) messages between parties and their metadata, including sender/ receiver information, ii) processed documents and their metadata, and iii) unprocessed documents and their metadata. It is understood that native components may include the document processor ("DP") 516, multi-channel communications controller ("MCCC"), and/or decisioner web user interface ("UI") 520. Via path 522, the decisioner web UI 520 may transmit document judgments, commentary, and other annotations to the DP 516.

In particular embodiments, the decisioner may generate a follow-up information request 1130, in which the decisioning party may request a follow-up information request of editable text box 1120 to be sent if the information and/or documents indicated as needed 102 in the document checklist are not received within a particular time frame. In the example of diagram 1100, the follow-up information request 1130 may be conditionally triggered based on the state of the information request. For example, the decisioning party may select the conditions of triggering the follow-up information request 1130 from being sent, such as by selecting that the follow-up information request 1130 is to be sent after three (3) days if the application is not yet marked as complete. In particular embodiments, the decisioner may select selectable option 1140, which may cause the graphical user interface to render a preview of the information request generated in editable text box 1120 and/or the follow-up information request 1130.

Figure 12:
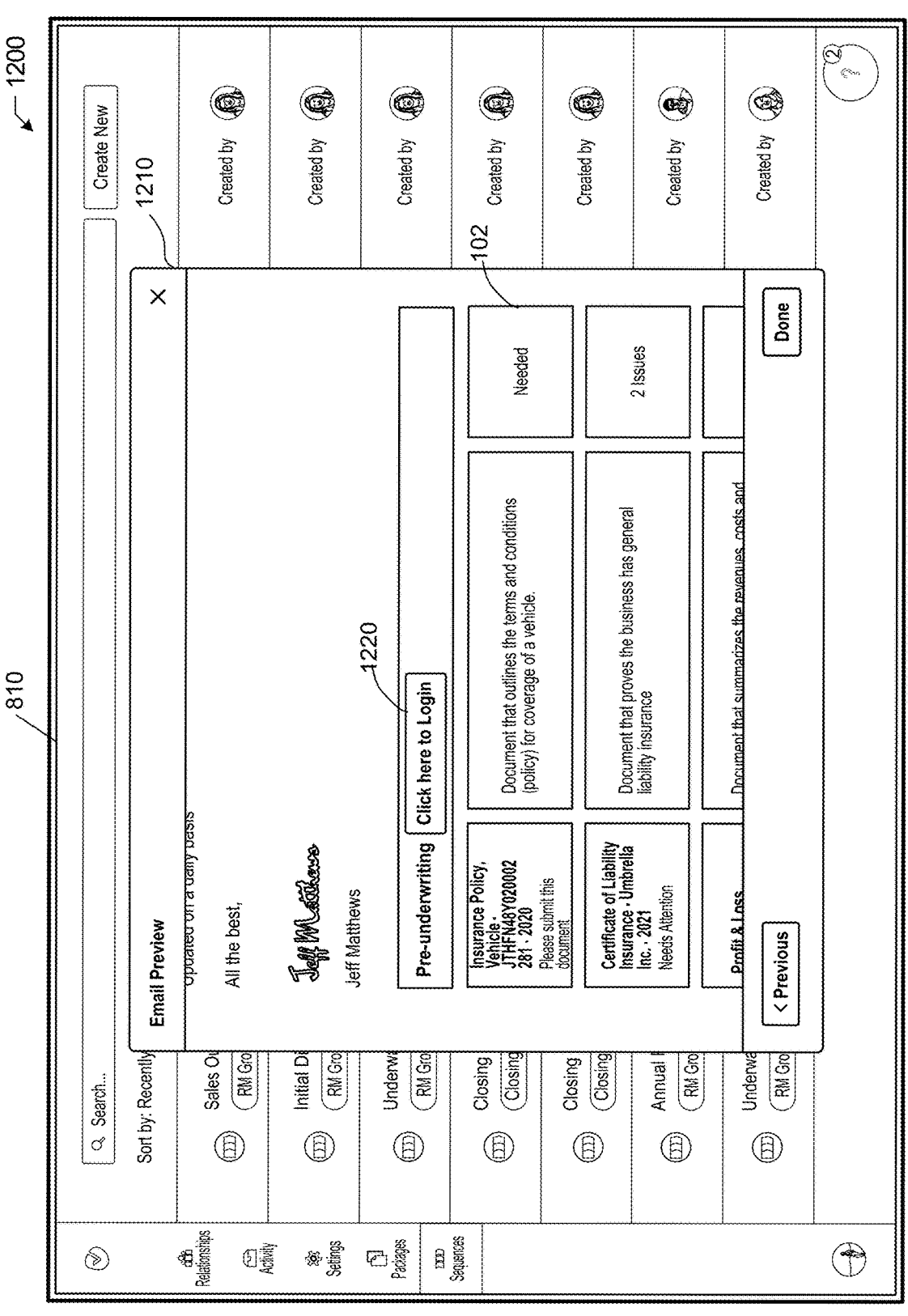
FIG. 12 illustrates an example graphical user interface in which a sequence may be rendered.

FIG. 12 illustrates a diagram 1200 of an example graphical user interface in which a sequence may be rendered. In particular embodiments, one or more processors of the internet-enabled devices of the decisioning party (e.g., workstation 550, portable computer system 552, and/or handheld device 554) may provide instructions to browser 810 to render the platform as part of a GUI to appear on the Decisioner's Web UI 520. In the example of diagram 1200, an in response to the decisioner selecting selectable option 1140 as in FIG. 11, email preview 1210 may be generated for display, wherein the email preview 1210 displays the personalized message as input in editable text box 1120 along with the attached embeddings reflecting the state of documents as needed 102 and/or received. In particular embodiments, the requestor may be prompted to Login via Login button 1220, wherein the requestor may login to the platform and upload the documents indicated as needed 102. In an embodiment, the system may be programmed to dynamically modify the currently active journey by adding the task indicated as "needed 102" for either immediate execution or staging. Said task will include an information exception embedding highlighting the change and will be marked as needed 102 to be sent from the relationship manager's inbox (e.g., decisioner's inbox). If the task is marked for immediate execution, the MCC's 518 task manager may send the information request will automatically. Otherwise, the information request may be surfaced to the decisioning party for final verification or modification prior to being sent.

Figure 13:
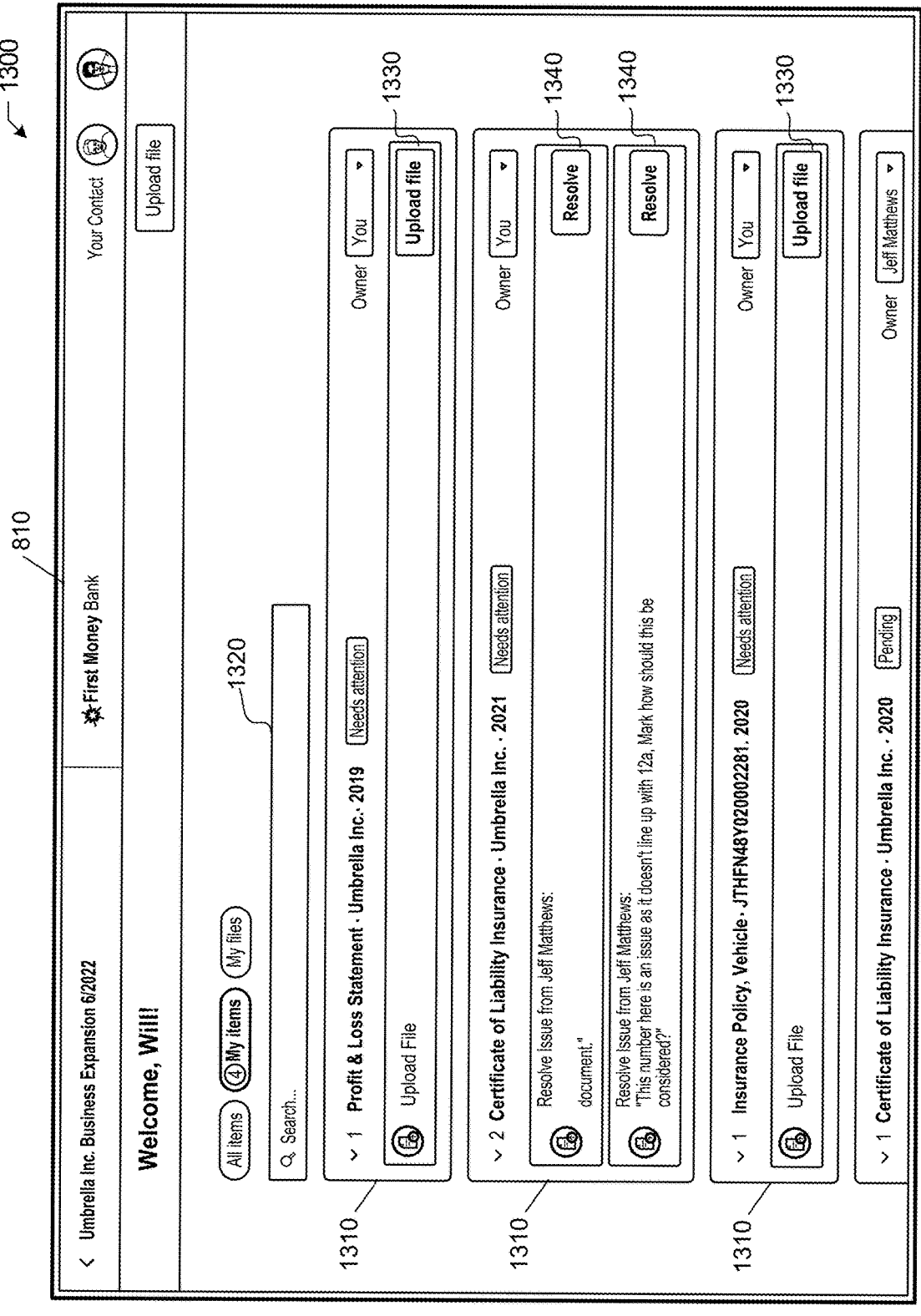
FIG. 13 illustrates a diagram of an example graphical user interface in which one embodiment of the portal may operate.

FIG. 13 illustrates a diagram 1300 of an example graphical user interface in which one embodiment of the portal may operate. In particular embodiments, in response to the requestor selecting login button 1220 of the information request and/or manually logging into the portal through a browser application, one or more processors of the internet-enabled devices of the requesting party (e.g., workstation 502, portable computer system 504, and/or handheld device 506) may provide instructions to browser 810 to render the platform (e.g., portal) as part of a GUI to appear on the Requestor's web UI 508. In this example, browser 810 may display a checklist of tasks labeled "needed" 102 corresponding to the information request as generated by the decisioning party. The documents requested as needed 102 may be displayed by list interface 1310, wherein information corresponding to the requested document may be displayed. For example, in diagram 1300, list interface 1310 may request a "Profit & Loss Statement—Umbrella Inc. 2019" as needed 102. The requestor, through the browser 810 of the portal may select an upload functionality 1330. In this example, the portal may be arranged to cause a graphical user interface to prompt or permit the requestor to search storage of the internet-enabled devices of the requesting party (e.g., workstation 502, portable computer system 504, and/or handheld device 506), select the requested file and/or document, and transfer the file and/or document to the Decisioner's SOR.

In particular embodiments, list interface 1310 may request data in the form of an editable text response. For example, in diagram 1300, list interface 1310 may display a comment from the decisioning party, such as, "This number here is an issue as it doesn't line up with 12a, Mark how should this be considered?" As an example and not by way of limitation, the requesting party may view the forementioned comment, and select resolve functionality 1340. The resolve functionality 1340, once selected, may generate an editable text box in which the requesting party may input a text response in response to the item indicated as needed 102 by the list interface 1310. As another example and not by way of limitation, the resolve functionality 1340, once selected, may generate an option to mark the item as "Resolved," wherein the status of the item of list interface 1310 may be transferred from "needed" 102 to "sent" 112 and/or "validated" 106. In an embodiment, a graphical user interface of a search bar 1320 may be displayed to the requesting party, wherein upon selection, the requesting party may be presented with an editable text input. In this example, the requesting party may input text, wherein response to receiving the input in search bar 1320, the platform may search the SOR for the document requested by the requesting party.

3. Implementation Example—Hardware Overview

FIG. 5, FIG. 6, FIG. 7 illustrate a distributed computer system showing the context of use and principal functional elements with which one embodiment could be implemented. In an embodiment, a computer system as shown in FIG. 5, FIG. 6, FIG. 7 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 5, FIG. 6, FIG. 7 illustrate only one of many possible arrangements of components configured to execute the programming described herein. Other arrangements may include fewer or different components, and the division of work between the components may vary depending on the arrangement.

The drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the problem of machine learning model development, validation, and deployment.

In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

Each flow diagram herein is intended as an illustration at the functional level at which skilled persons, in the art to which this disclosure pertains, communicate with one another to describe and implement algorithms using programming. The flow diagrams are not intended to illustrate every instruction, method object or sub-step that would be needed to program every aspect of a working program, but are provided at the same functional level of illustration that is normally used at the high level of skill in this art to communicate the basis of developing working programs.

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 14:
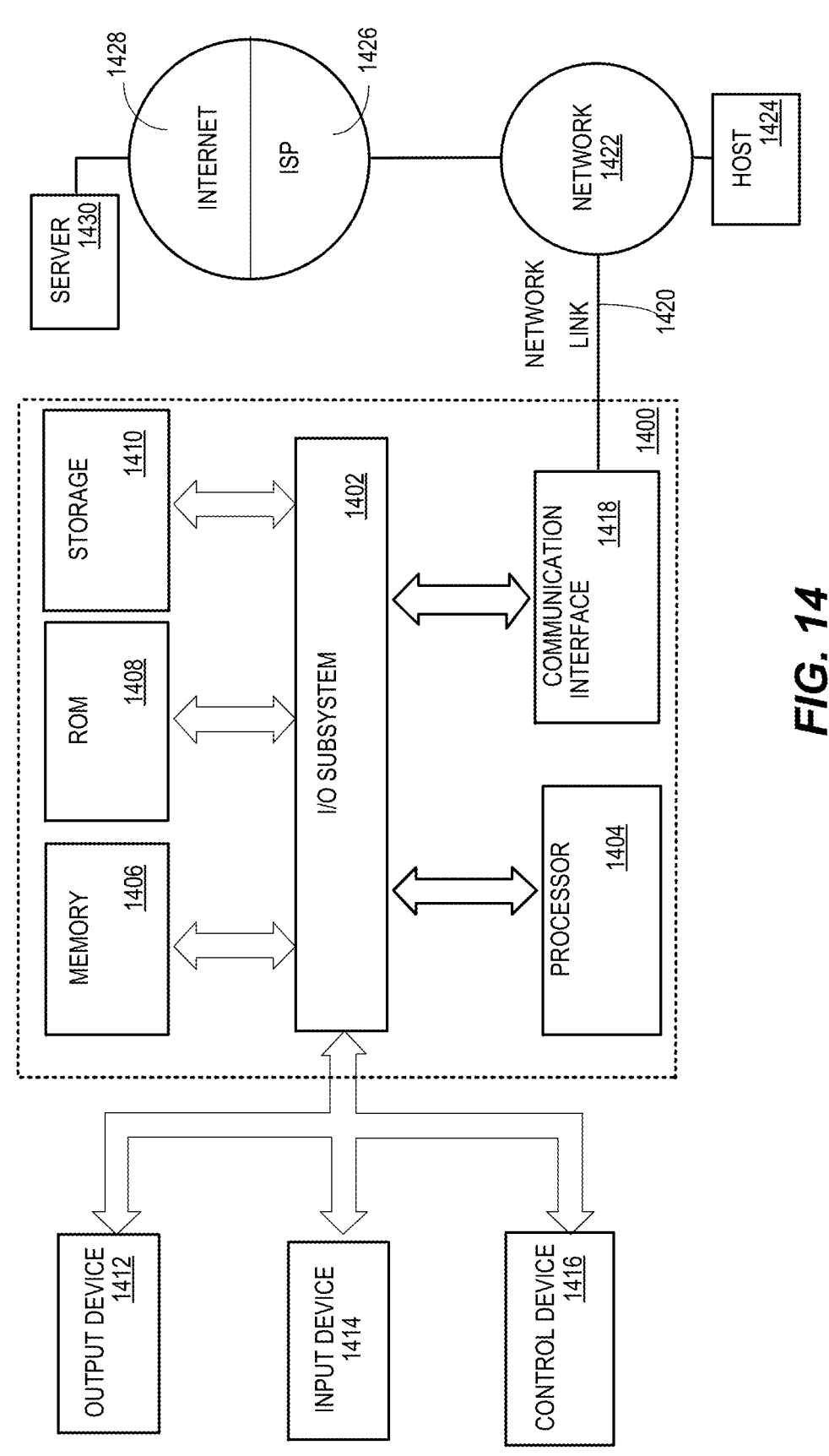
FIG. 14 illustrates a computer system with which embodiments may be implemented.

FIG. 14 is a block diagram that illustrates an example computer system with which an embodiment may be implemented. In the example of FIG. 14, a computer system 1400 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 1400 includes an input/output (I/O) subsystem 1402 which may include a bus and/or other communication mechanism(s) for communicating information and/or instructions between the components of the computer system 1400 over electronic signal paths. The I/O subsystem 1402 may include an I/O controller, a memory controller and at least one I/O port. The electronic signal paths are represented schematically in the drawings, for example as lines, unidirectional arrows, or bidirectional arrows.

At least one hardware processor 1404 is coupled to I/O subsystem 1402 for processing information and instructions. Hardware processor 1404 may include, for example, a general-purpose microprocessor or microcontroller and/or a special-purpose microprocessor such as an embedded system or a graphics processing unit (GPU) or a digital signal processor or ARM processor. Processor 1404 may comprise an integrated arithmetic logic unit (ALU) or may be coupled to a separate ALU.

Computer system 1400 includes one or more units of memory 1406, such as a main memory, which is coupled to I/O subsystem 1402 for electronically digitally storing data and instructions to be executed by processor 1404. Memory 1406 may include volatile memory such as various forms of random-access memory (RAM) or other dynamic storage device. Memory 1406 also may be used for storing temporary variables or other intermediate information during execution of instructions to be executed by processor 1404. Such instructions, when stored in non-transitory computer-readable storage media accessible to processor 1404, can render computer system 1400 into a special-purpose machine that is customized to perform the operations specified in the instructions.

Computer system 1400 further includes non-volatile memory such as read only memory (ROM) 1408 or other static storage device coupled to I/O subsystem 1402 for storing information and instructions for processor 1404. The ROM 1408 may include various forms of programmable ROM (PROM) such as erasable PROM (EPROM) or electrically erasable PROM (EEPROM). A unit of persistent storage 1410 may include various forms of non-volatile RAM (NVRAM), such as FLASH memory, or solid-state storage, magnetic disk or optical disk such as CD-ROM or DVD-ROM and may be coupled to I/O subsystem 1402 for storing information and instructions. Storage 1410 is an example of a non-transitory computer-readable medium that may be used to store instructions and data which when executed by the processor 1404 cause performing computer-implemented methods to execute the techniques herein.

The instructions in memory 1406, ROM 1408 or storage 1410 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 1400 may be coupled via I/O subsystem 1402 to at least one output device 1412. In one embodiment, output device 1412 is a digital computer display. Examples of a display that may be used in various embodiments include a touch screen display or a light-emitting diode (LED) display or a liquid crystal display (LCD) or an e-paper display. Computer system 1400 may include other type(s) of output devices 1412, alternatively or in addition to a display device. Examples of other output devices 1412 include printers, ticket printers, plotters, projectors, sound cards or video cards, speakers, buzzers or piezoelectric devices or other audible devices, lamps or LED or LCD indicators, haptic devices, actuators, or servos.

At least one input device 1414 is coupled to I/O subsystem 1402 for communicating signals, data, command selections or gestures to processor 1404. Examples of input devices 1414 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 1416, which may perform cursor control or other automated control functions such as navigation in a graphical interface on a display screen, alternatively or in addition to input functions. Control device 1416 may be a touchpad, a mouse, a trackball, or cursor direction keys for communicating direction information and command selections to processor 1404 and for controlling cursor movement on display 1412. The input device may have at least two degrees of freedom in two axes, a first axis (for example, x) and a second axis (for example, y), that allows the device to specify positions in a plane. Another type of input device is a wired, wireless, or optical control device such as a joystick, wand, console, steering wheel, pedal, gearshift mechanism or other type of control device. An input device 1414 may include a combination of multiple different input devices, such as a video camera and a depth sensor.

In another embodiment, computer system 1400 may comprise an internet of things (IoT) device in which one or more of the output device 1412, input device 1414, and control device 1416 are omitted. Or, in such an embodiment, the input device 1414 may comprise one or more cameras, motion detectors, thermometers, microphones, seismic detectors, other sensors or detectors, measurement devices or encoders and the output device 1412 may comprise a special-purpose display such as a single-line LED or LCD display, one or more indicators, a display panel, a meter, a valve, a solenoid, an actuator or a servo.

When computer system 1400 is a mobile computing device, input device 1414 may comprise a global positioning system (GPS) receiver coupled to a GPS module that is capable of triangulating to a plurality of GPS satellites, determining and generating geo-location or position data such as latitude-longitude values for a geophysical location of the computer system 1400. Output device 1412 may include hardware, software, firmware and interfaces for generating position reporting packets, notifications, pulse or heartbeat signals, or other recurring data transmissions that specify a position of the computer system 1400, alone or in combination with other application-specific data, directed toward host 1424 or server 1430.

Computer system 1400 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 1400 in response to processor 1404 executing at least one sequence of at least one instruction contained in main memory 1406. Such instructions may be read into main memory 1406 from another storage medium, such as storage 1410. Execution of the sequences of instructions contained in main memory 1406 causes processor 1404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 1410. Volatile media includes dynamic memory, such as memory 1406. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 1402. Transmission media can also take the form of acoustic or light waves, such as those generated during radio-wave and infra-red data communications.

Various forms of media may be involved in carrying at least one sequence of at least one instruction to processor 1404 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 1400 can receive the data on the communication link and convert the data to a format that can be read by computer system 1400. For instance, a receiver such as a radio frequency antenna or an infrared detector can receive the data carried in a wireless or optical signal and appropriate circuitry can provide the data to I/O subsystem 1402 such as place the data on a bus. I/O subsystem 1402 carries the data to memory 1406, from which processor 1404 retrieves and executes the instructions. The instructions received by memory 1406 may optionally be stored on storage 1410 either before or after execution by processor 1404.

Computer system 1400 also includes a communication interface 1418 coupled to bus 1402. Communication interface 1418 provides a two-way data communication coupling to network link(s) 1420 that are directly or indirectly connected to at least one communication networks, such as a network 1422 or a public or private cloud on the Internet. For example, communication interface 1418 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 1422 broadly represents a local area network (LAN), wide-area network (WAN), campus network, internetwork or any combination thereof. Communication interface 1418 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 1418 sends and receives electrical, electromagnetic or optical signals over signal paths that carry digital data streams representing various types of information.

Network link 1420 typically provides electrical, electromagnetic, or optical data communication directly or through at least one network to other data devices, using, for example, satellite, cellular, Wi-Fi, or BLUETOOTH technology. For example, network link 1420 may provide a connection through a network 1422 to a host computer 1424.

Furthermore, network link 1420 may provide a connection through network 1422 or to other computing devices via internetworking devices and/or computers that are operated by an Internet Service Provider (ISP) 1426. ISP 1426 provides data communication services through a world-wide packet data communication network represented as internet 1428. A server computer 1430 may be coupled to internet 1428. Server 1430 broadly represents any computer, data center, virtual machine or virtual computing instance with or without a hypervisor, or computer executing a containerized program system such as DOCKER or KUBERNETES.

Server 1430 may represent an electronic digital service that is implemented using more than one computer or instance and that is accessed and used by transmitting web services requests, uniform resource locator (URL) strings with parameters in HTTP payloads, API calls, app services calls, or other service calls. Computer system 1400 and server 1430 may form elements of a distributed computing system that includes other computers, a processing cluster, server farm or other organization of computers that cooperate to perform tasks or execute applications or services. Server 1430 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 1430 may comprise a web application server that hosts a presentation layer, application layer and data storage layer such as a relational database system using structured query language (SQL) or no SQL, an object store, a graph database, a flat file system or other data storage.

Computer system 1400 can send messages and receive data and instructions, including program code, through the network(s), network link 1420 and communication interface 1418. In the Internet example, a server 1430 might transmit a requested code for an application program through Internet 1428, ISP 1426, local network 1422 and communication interface 1418. The received code may be executed by processor 1404 as it is received, and/or stored in storage 1410, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 1404. While each processor 1404 or core of the processor executes a single task at a time, computer system 1400 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method of transaction processing with multi-channel communication and decision support comprising:

generating, via a document processing engine, one or more requests for information;

transmitting, by the document processing engine, the one or more requests for information to a requesting party, via a multi-channel communication system;

receiving, via the document processing engine, one or more documents and corresponding metadata transmitted by the requesting party, in response to the one or more requests for information;

automatically processing, via the document processing engine, the one or more documents and corresponding metadata transmitted by the requesting party;

automatically validating, via the document processing engine, the one or more documents and corresponding metadata transmitted by the requesting party;

triggering, via the multi-channel communication system, one or more journeys comprised of first and second tasks, wherein completion of a journey of the one or more journeys results in a communication by the multi-channel communication system;

wherein executing the first task comprises transmitting a first message that is generated by retrieving a first message template from a content management system ("CMS") and populating the first message template with a message recipient value as found by a back-end component, text from a data store and/or the back-end component, and an information exception embedding that details a difference between a current state of the one or more documents and a required corpus of one or more required documents;

wherein the second task is executed based on a triggering condition that uses information received as a response to the first message, and wherein executing the second task comprises transmitting a second message that is generated by retrieving and populating a second message template from the CMS; and storing, via a system of record, the one or more processed documents and corresponding metadata.

2. The computer-implemented method of claim 1, further comprising automatically matching, via the document processing engine, entities from the one or more documents and corresponding metadata to back-end components.

3. The computer-implemented method of claim 1, further comprising automatically categorizing, via the document processing engine, the one or more documents and corresponding metadata according to a canonical document ontology.

4. The computer-implemented method of claim 1, further comprising automatically transforming, via the document processing engine, one or more pages of the document one or more documents to enhance legibility.

5. The computer-implemented method of claim 1, further comprising automatically identifying, via the document processing engine, conformity and/or nonconformity with exception conditions as defined in a document exception policy.

6. The computer-implemented method of claim 5, wherein the document exception policy further includes absence and/or existence of a signature; a signature block matching the name of the requesting party; and a document execution date within a specific time range.

7. The computer-implemented method of claim 5, further comprising, in response to nonconformity with exception conditions as defined in the document exception policy, automatically storing the document in a data store for further intervention.

8. The computer-implemented method of claim 1 wherein each of the one or more journeys further comprise ordered tasks and the ordered tasks are triggered by the completion of one or more prior tasks.

9. The computer-implemented method of claim 1, wherein the first message is transmitted such that the first message appears to be sent by a decisioning party.

10. The computer-implemented method of claim 9, wherein the information exception embedding further includes:

one or more documents the requesting party expects but has not received;

metadata of the received one or more documents;

information indicating whether or not the one or more documents has been validated;

commentary from the requesting party regarding errors on the document; and uniform resource locator ("URL") links to further information on the information exception embedding not directly visible in the embedding but accessible through the URL.

11. The computer-implemented method of claim 1, wherein the information exception embedding represents the embedding at a fixed point of time.

12. The computer-implemented method of claim 1, wherein the information exception embedding represents the embedding in real-time.

13. The computer-implemented method of claim 1, wherein the one or more journeys are each associated with a respective workflow defined in a workflow/customer relationship management system.

14. The computer-implemented method of claim 1, wherein populating the second message template comprises populating a second message recipient value as found by the back-end component and populating second text from the data store and/or the back-end component.

* * * * *